(12) United States Patent
Bay et al.

(10) Patent No.: US 12,206,900 B2
(45) Date of Patent: *Jan. 21, 2025

(54) SYSTEMS, METHODS, AND APPARATUSES FOR VIDEO PROCESSING

(71) Applicant: Comcast Cable Communications, LLC, Philadelphia, PA (US)

(72) Inventors: Douglas Bay, Castle Rock, CO (US); David Leach, Centennial, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,569

(22) Filed: Jun. 30, 2023

(65) Prior Publication Data
US 2024/0040153 A1 Feb. 1, 2024

Related U.S. Application Data

(63) Continuation of application No. 17/583,525, filed on Jan. 25, 2022, now Pat. No. 11,736,730, which is a continuation of application No. 16/051,808, filed on Aug. 1, 2018, now Pat. No. 11,265,579.

(51) Int. Cl.
| | | |
|---|---|---|
| *H04N 19/625* | (2014.01) | |
| *H04N 9/77* | (2006.01) | |
| *H04N 19/172* | (2014.01) | |
| *H04N 19/174* | (2014.01) | |
| *H04N 19/176* | (2014.01) | |
| *H04N 19/182* | (2014.01) | |

(52) U.S. Cl.
CPC ............ *H04N 19/625* (2014.11); *H04N 9/77* (2013.01); *H04N 19/172* (2014.11); *H04N 19/174* (2014.11); *H04N 19/176* (2014.11); *H04N 19/182* (2014.11)

(58) Field of Classification Search
CPC ............................. H04N 19/625; H04N 19/77
See application file for complete search history.

(56) References Cited

U.S. PATENT DOCUMENTS

| | | | |
|---|---|---|---|
| 6,892,390 B1 * | 5/2005 | Lieberman | H04N 21/4355 725/135 |
| 10,063,886 B2 * | 8/2018 | Ye | H04N 19/597 |
| 10,257,542 B1 * | 4/2019 | Brailovskiy | H04N 9/67 |

(Continued)

FOREIGN PATENT DOCUMENTS

WO    2013/192537 A2    12/2013

OTHER PUBLICATIONS

European Search Report and Search Opinion Received for EP Application No. 19189540.8, mailed on Dec. 12, 2019, 7 pages.

(Continued)

*Primary Examiner* — Irfan Habib
(74) *Attorney, Agent, or Firm* — BakerHostetler

(57) ABSTRACT

Systems, methods, and apparatuses are described for processing video. Encoded video data may be determined from uncompressed video data. A chrominance component for a portion of the encoded video data may be determined that references another portion of the encoded video data. A luma component of the portion of the encoded video data may be determined to correspond with the luma component of the corresponding portion of the uncompressed video data.

20 Claims, 12 Drawing Sheets

(56) References Cited

U.S. PATENT DOCUMENTS

| | | | |
|---|---|---|---|
| 10,708,599 B2* | 7/2020 | Syed | H04N 19/167 |
| 10,735,739 B2* | 8/2020 | Mao | H04N 19/197 |
| 2005/0035974 A1* | 2/2005 | Nair | G09G 5/06 |
| | | | 345/589 |
| 2009/0319845 A1* | 12/2009 | Liu | H03M 13/3761 |
| | | | 370/312 |
| 2010/0232505 A1* | 9/2010 | Thoreau | H04N 19/523 |
| | | | 375/E7.123 |
| 2011/0265134 A1* | 10/2011 | Jaggi | H04N 19/40 |
| | | | 725/109 |
| 2012/0070102 A1* | 3/2012 | Yokokawa | G06T 7/0002 |
| | | | 382/286 |
| 2013/0034171 A1* | 2/2013 | Winken | H04N 19/159 |
| | | | 375/E7.026 |
| 2013/0051469 A1* | 2/2013 | Park | H04N 19/11 |
| | | | 375/E7.243 |
| 2013/0051659 A1* | 2/2013 | Yamamoto | H04N 13/261 |
| | | | 382/154 |
| 2013/0127989 A1* | 5/2013 | Chen | H04N 13/261 |
| | | | 348/E13.001 |
| 2013/0147915 A1* | 6/2013 | Wiegand | H04N 19/139 |
| | | | 348/43 |
| 2013/0259365 A1* | 10/2013 | Suzuki | G06T 5/90 |
| | | | 382/164 |
| 2013/0271565 A1* | 10/2013 | Chen | H04N 19/597 |
| | | | 348/42 |
| 2013/0271566 A1* | 10/2013 | Chen | H04N 19/176 |
| | | | 348/43 |
| 2013/0329008 A1* | 12/2013 | Takahashi | H04N 13/161 |
| | | | 348/43 |
| 2014/0010293 A1* | 1/2014 | Srinivasan | H04N 19/33 |
| | | | 375/240.12 |
| 2014/0064379 A1* | 3/2014 | Mrak | H04N 19/136 |
| | | | 375/240.18 |
| 2014/0153645 A1* | 6/2014 | Zhang | H04N 19/513 |
| | | | 375/240.12 |
| 2014/0173680 A1* | 6/2014 | Gilbert | H04N 21/44004 |
| | | | 725/134 |
| 2014/0247871 A1* | 9/2014 | Merkle | H04N 19/96 |
| | | | 375/240.12 |
| 2014/0286433 A1* | 9/2014 | He | H04N 19/53 |
| | | | 375/240.16 |
| 2014/0293299 A1* | 10/2014 | Ozawa | H04N 1/642 |
| | | | 358/1.9 |
| 2014/0293380 A1* | 10/2014 | Hasegawa | H04N 1/56 |
| | | | 358/505 |
| 2014/0376634 A1* | 12/2014 | Guo | H04N 19/523 |
| | | | 375/240.16 |
| 2015/0016512 A1 | 1/2015 | Pu et al. | |
| 2015/0016533 A1* | 1/2015 | Pang | H04N 19/523 |
| | | | 375/240.16 |
| 2015/0019532 A1* | 1/2015 | Kim | G06F 16/5866 |
| | | | 707/736 |
| 2015/0036744 A1* | 2/2015 | Sato | H04N 19/33 |
| | | | 375/240.12 |
| 2015/0043641 A1* | 2/2015 | Gamei | H04N 19/124 |
| | | | 375/240.12 |
| 2015/0078447 A1* | 3/2015 | Gamei | H04N 19/157 |
| | | | 375/240.12 |
| 2015/0085917 A1* | 3/2015 | Hendry | H04N 19/188 |
| | | | 375/240.02 |
| 2015/0110174 A1* | 4/2015 | Gu | H04N 19/136 |
| | | | 375/240.03 |
| 2015/0124868 A1* | 5/2015 | Kim | H04N 19/117 |
| | | | 375/240.02 |
| 2015/0146976 A1 | 5/2015 | Ma et al. | |
| 2015/0195559 A1* | 7/2015 | Chen | H04N 19/11 |
| | | | 375/240.16 |
| 2015/0195573 A1* | 7/2015 | Aflaki Beni | H04N 19/513 |
| | | | 375/240.16 |
| 2015/0245061 A1* | 8/2015 | Chen | H04N 19/159 |
| | | | 375/240.13 |
| 2015/0271515 A1* | 9/2015 | Pang | H04N 19/70 |
| | | | 375/240.16 |
| 2015/0373325 A1 | 12/2015 | Karczewicz et al. | |
| 2016/0037186 A1* | 2/2016 | Wendel | H04N 19/89 |
| | | | 375/240.27 |
| 2016/0065988 A1* | 3/2016 | Kawamura | H04N 19/119 |
| | | | 375/240.12 |
| 2016/0119631 A1* | 4/2016 | Kawamura | H04N 19/196 |
| | | | 375/240.12 |
| 2017/0272748 A1 | 9/2017 | Seregin et al. | |
| 2017/0303009 A1* | 10/2017 | Nakamura | H04N 21/233 |
| 2017/0310977 A1 | 10/2017 | Laroche et al. | |
| 2017/0359576 A1* | 12/2017 | Gamei | H04N 19/129 |

OTHER PUBLICATIONS

US Patent Application filed Jan. 25, 2022, entitled "Systems, Methods, and Apparatuses for Video Processing", U.S. Appl. No. 17/583,525.

* cited by examiner

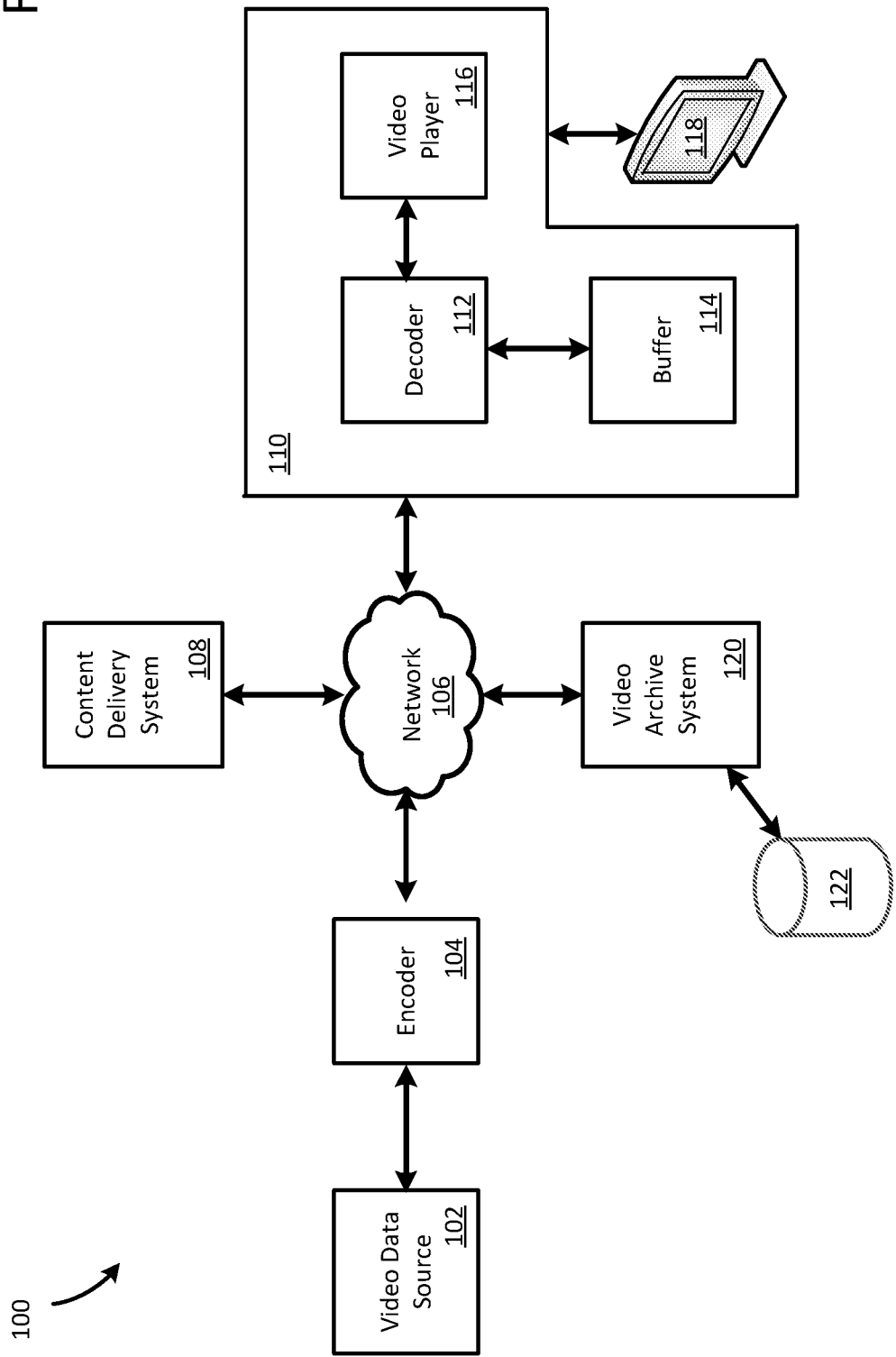

SYSTEMS, METHODS, AND APPARATUSES FOR VIDEO PROCESSING

CROSS REFERENCE TO RELATED APPLICATIONS

This application is a continuation of U.S. patent application Ser. No. 17/583,525 filed Jan. 25, 2022, now U.S. Pat. No. 11,736,730, issued Aug. 22, 2023, which is a continuation of U.S. patent application Ser. No. 16/051,808, filed Aug. 1, 2018, now U.S. Pat. No. 11,265,579, issued Mar. 1, 2022, each of which are hereby incorporated by reference in their entirety.

BACKGROUND

Networks, such as a content provider's distribution network, allow video to be shared from a source to a consumer. Prior to transmission, raw video is usually compressed. Upon arrival at an end destination, compressed video is decompressed for consumption. Compressing video reduces the size of the video, allowing the video to be transmitted at a lower bandwidth, and allowing for more efficient storage of video. Yet compression may also degrade image quality and introduce various visual artifacts. Such degraded video may fail to meet viewers' quality expectations and/or render the compressed video unsuitable for archival storage. Thus there is a need for improved video processing.

SUMMARY

Systems, methods, and apparatuses are described for video processing. Uncompressed video data may be received and subject to video encoding. In encoding a portion (e.g., a partition) of the uncompressed video data, a luma component of a first pixel may be determined separately from the chrominance component(s) of the first pixel. The chrominance component(s) of the first pixel may be determined based on another, second pixel that is already encoded. The chrominance component(s) of the first pixel may use the respective chrominance components of the encoded second pixel as reference data. The luma component of the first pixel may be determined based on the luma component of the corresponding pixel in the uncompressed video data. The luma component of the corresponding pixel in the uncompressed video data may be carried over to the luma component of the first pixel such that the luma component of the first pixel is the same as the luma component of the corresponding pixel in the uncompressed video data.

BRIEF DESCRIPTION OF THE DRAWINGS

The following drawings illustrate generally, by way of example, but not by way of limitation, various examples discussed in the present disclosure. In the drawings:

FIG. 1 shows a block diagram of a video processing system.

DETAILED DESCRIPTION

Figure 2A:
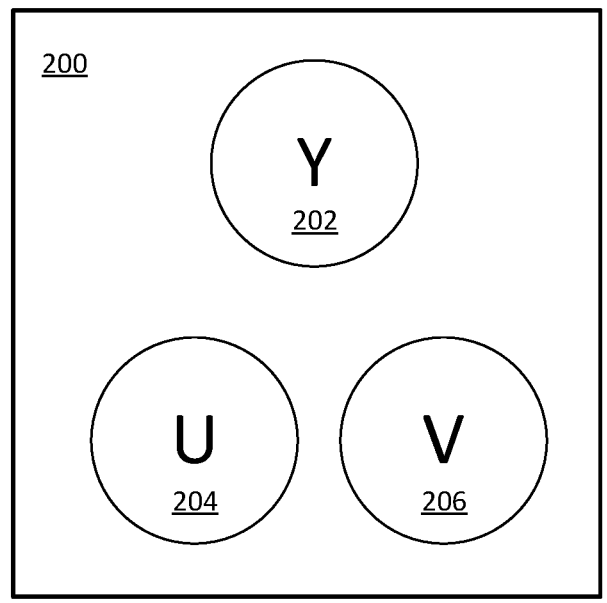
FIG. 2A shows pixel data.

Video may be comprised of video frames, or pictures. Video frames may be comprised of pixels. A pixel may be a smallest controllable element of a video frame. A video frame may comprise bits for controlling each associated pixel. A portion of the bits for an associated pixel may control a luma (e.g., light intensity) value of the pixel. A portion of the bits for an associated pixel may control one or more chrominance (e.g., color) values of the pixel.

When video is transmitted from one location to another, the video may be encoded using a compression technique prior to transmission and decoded (e.g., decompressed) prior to consumption. The compression technique may comprise using luma values for each compressed pixel that correspond to luma values in associated pixels in the original uncompressed (i.e., raw) video data. The compression technique may comprise allowing chrominance values for a encoded pixel to refer to chrominance values of another compressed pixel.

The compression technique may result in the luma bits of pixels of decompressed video being identical to the associated luma bits of pixels of the original, uncompressed video data. The compression technique may result in the pixels of the encoded video comprising less chrominance bits than the associated pixels of the original, raw video. Because luma may heavily affect a viewer's perception of a video, the compression technique may allow a video asset to have near raw quality, while reducing the size of the video during transmission and/or storage.

The systems, methods, and apparatuses described herein may allow for a finer way to encode video data within a file other than just frames. The systems, methods, and apparatuses described herein may allow for more control over compression, file, size, and quality than the control permitted from compression currently available. The systems, methods, and apparatuses described herein may take advantage of inexpensive hard drive space and cheaper processing power to provide compressed video that, upon decoding and consumption, appears to more closely resemble the original, uncompressed video than video viewed using current compression methods. That is, video compression may be performed to prioritize (e.g., maximize) video quality over reduction in file size or bit stream rate. The video compression techniques described herein may find use in a video archiving or storage system in which video quality is of paramount importance while video size is secondary, although the disclosure is not so limited. Relegation of video size to secondary concern in an archiving system may be possible due to the progressively-reduced costs of data storage. Archived video also may not be subject to frequent transmission over remote networks, as is commonly the case with a video distribution system. Thus there is a less acute need for maximum size compression in a video archive system.

The systems, methods, and apparatuses described herein may be faster than conventional encoding. The systems, methods, and apparatuses described herein may need less processing power than conventional encoding. The systems, methods, and apparatuses described herein may need fewer data points to encode video than conventional encoding. The systems, methods, and apparatuses described herein may search more broadly (e.g., in motion estimation) than conventional compression/encoding. A more broad search may be possible because a best match search algorithm may need only consider chrominance as a variable, rather than both chrominance and luma. For similar reasons, the techniques described herein may allow, given the same best match search area, a deeper and more thorough search of the search area for the best match. A resulting best matching video data may yield a higher quality encoded video than would be otherwise possible given equal resources.

FIG. 1 shows system 100 associated with video processing. The system 100 may comprise a video data source 102, an encoder 104, a content delivery system 108, a client device 110, and a video archive system 120. The video archive system 120 may be communicatively connected to a databased 122 to store archived video data.

The video data source 102, the encoder 104, the content delivery system 108, the client device 110, the video archive system 120, and/or any other component of the system 100 may be interconnected via a network 106. The network 106 may comprise a wired network, a wireless network, or any combination thereof. The network 106 may comprise a public network, such as the Internet. The network 106 may comprise a private network, such as a content provider's distribution system.

The video data source 102 may comprise a headend, a video on-demand server, a cable modem termination system, the like, and/or any combination of the foregoing. The video data source 102 may provide uncompressed, raw video data comprising a sequence of frames. The video data source 102 and the encoder 104 may be incorporated as a single device and/or may be co-located at a premises. The video data source 102 may provide the uncompressed video data based on a request for the uncompressed video data, such as a request from the encoder 104, the client device 110, the content delivery system 108, and/or the video archive system 120.

The content delivery system 108 may receive a request for video data from the client device 110. The content delivery system 108 may authorize/authenticate the request and/or the client device 110 from which the request originated. The request for video data may comprise a request for a channel, a video on-demand asset, a website address, a video asset associated with a streaming service, the like, and/or any combination of the foregoing. The video data source 102 may transmit the requested video data to the encoder 104.

The encoder 104 may encode (e.g., compress) the video data. The compression technique used to encode the video data may comprise maintaining the luma bit values from the uncompressed video data in the compressed video data. The compression technique may comprise encoding the chrominance bit values according to a video compression standard. The video compression standard may comprise H.264, H.265, or any other video compression standard. The compression technique may comprise intra-frame encoding, inter-frame encoding, or any combination thereof. The compression technique may comprise discrete cosine transform (DCT), spatial prediction, temporal prediction, motion estimation, any other technique for predicting motion vectors, the like, and/or any combination of the foregoing. The compression technique may comprise quantization and/or entropy encoding.

The encoder 104 may transmit the encoded video data to the requesting component, such as the content delivery system 108 or the client device 110. The content delivery system 108 may transmit the requested encoded video data to the requesting client device 110.

The video archive system 120 may provide a request for encoded video data. The video archive system 120 may provide the request to the encoder 104 and/or the video data source 102. Based on the request, the encoder 104 may receive the corresponding uncompressed video data. The encoder 104 may encode the uncompressed video data to generate the requested encoded video data. The encoded video data may be provided to the video archive system 120. The video archive system 120 may store (e.g., archive) the encoded video data from the encoder 104. The encoded video data may be stored in the database 122. The stored encoded video data may be maintained for purposes of backup or archive. The stored encoded video data may be stored for later use as "source" video data, to be encoded again and provided for viewer consumption. The stored encoded video data may be provided to the content delivery system 108 based on a request from a client device 110 for the encoded video data. The video archive system 120 may provide the requested encoded video data to the client device 110.

The client device 110 may comprise a decoder 112, a buffer 114, and a video player 116. The client device 110 (e.g., the video player 116) may be communicatively connected to a display 118. The display 118 may be a separate and discrete component from the client device 110, such as a television display connected to a set-top box. The display 118 may be integrated with the client device 110. The decoder 112, the video player 116, the buffer 114, and the display 118 may be realized in a single device, such as a laptop or mobile device. The client device 110 (and/or the client device 110 paired with the display 118) may comprise a television, a monitor, a laptop, a desktop, a smart phone, a set-top box, a cable modem, a gateway, a tablet, a wearable computing device, a mobile computing device, any computing device configured to receive and/or playback video, the like, and/or any combination of the foregoing. The decoder 112 may decompress/decode the encoded video data. The encoded video data may be received from the encoder 104. The encoded video data may be received from the content delivery system 108, and/or the video archive system 120.

The luma bit values of the decompressed/decoded video data from the decoder 112 may be identical to corresponding luma bit values of the uncompressed video data at the video data source 102. During decoding, the decoder 112 may store reference frames and/or portions thereof in the buffer 114. The reference frames and/or portions thereof may comprise only chrominance components of the frame/portion but not luma components of the frame/portion. The decoder 112 may access the reference frames and/or portions thereof stored in the buffer 114 to decode other frames and/or partitions of the encoded video data. The decoder 112 may provide the decompressed/decoded video data to the video player 116. The video player 116 may cause video associated with the decompressed/decoded video data to be displayed on the display 118.

FIG. 2A shows first pixel data 200 of an uncompressed video frame or portion thereof (e.g., a partition). The first pixel data 200 may comprise image data indicating a pixel of an image (e.g., a frame). The first pixel data 200 may comprise image data indicating a partition of an image (e.g., a frame). A partition of an image may comprise a frame, block, macroblock, slice, a pixel, or other type of partition. The first pixel data 200 may be indicated in the uncompressed video data provided by the video data source 102 in FIG. 1. The first pixel data 200 may be indicated in uncompressed video data that is input to the encoder 104 in FIG. 1.

The first pixel data 200 may comprise luma (Y or Y') bits 202 to control brightness associated with the pixel, partition, and/or image indicated by the first pixel data 200. The first pixel data 200 may comprise first chrominance (U or Cb or Pb) bits 204 to control a first color component associated with the pixel, partition, and/or image indicated by the first pixel data 200. The first pixel data 200 may comprise second chrominance (V or Cr or Pr) bits 206 to control a second color component associated with the first pixel data 200. The first pixel data 200 may comprise bits according to any type of color space, such as YUV, Y'UV, YCbCr, Y'CbCr, YPbPr, and/or Y'PbPr.

Each of the luma bits 202, first chrominance bits 204, and second chrominance bits 206 may comprise image data. The luma bits 202, the first chrominance bits 204, the second chrominance bits 206, and indeed the first pixel data 200, may comprise data besides image data, such as header information, metadata, and/or reference information. The reference information may indicate one or more motion vectors (global and/or block), other pixel data to use as a reference, and/or residual information (spatial and/or temporal). Luma bits, first chrominance bits, second chrominance bits of other pixel data (e.g., the second pixel data 210 and/or the third pixel data 220 in FIG. 2B) may likewise comprise image data as well as other non-image data, such as header information, metadata, and/or reference information.

Figure 2B:
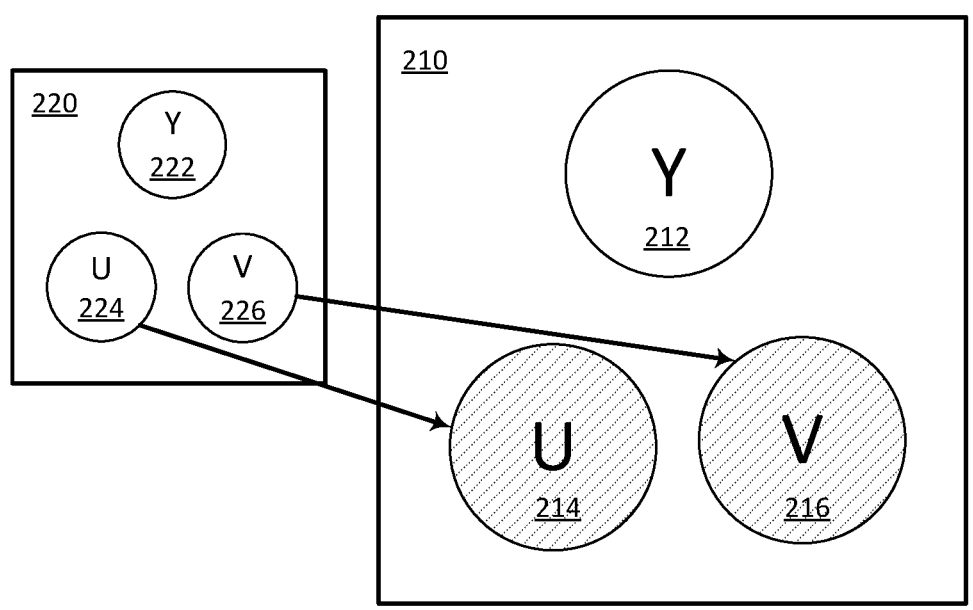
FIG. 2B shows pixel data.

FIG. 2B shows second pixel data 210 of an encoded (e.g., compressed) video frame or portion thereof. The compressed video frame or portion thereof may correspond to the uncompressed video frame or portion thereof associated with the first pixel data 200. The second pixel data 210 may correspond to the first pixel data 200 in FIG. 2A. The second pixel data 210 may be an encoded form of the first pixel data 200. The second pixel data 210 and the first pixel data 200 may indicate common video content (or near representation thereof if subject to any lossy compression) in the encoded video frame or portion thereof and the uncompressed video frame or portion thereof, respectively. Third pixel data 220 may be pixel data of an encoded video frame or portion thereof. The video frame/portion comprising the third pixel data 220 may be the same video frame/portion as that comprising the second pixel data 210. The video frame/portion comprising the third pixel data 220 may be different than that comprising the second pixel data 210.

The second pixel data 210 may be based on the third pixel data 220. The second pixel data 210 may use the third pixel data 220 as reference image data. In decoding the video frame or portion thereof comprising the second pixel data 210, the decoder may reference the third pixel data 220 (which may have already been decoded itself). It is noted that the representations of the second pixel data 210 and the third pixel data 220 shown in FIG. 2B are not to scale and no inferences should be drawn from such.

The second pixel data 210 may comprise luma (Y or Y') bits 212 to control brightness associated with the pixel, partition, and/or image indicated by the second pixel data 210. The second pixel data 210 may comprise first chrominance (U or Cb or Pb) bits 214 to control a first color component associated with the pixel, partition, and/or image indicated by the second pixel data 210. The second pixel data 210 may comprise second chrominance (V or Cr or Pr) bits 216 to control a second color component associated with the second pixel data 210. The luma bits 212, the first chrominance bits 214, and the second chrominance bits 216 in the second pixel data 210 may correspond to the luma bits 202, the first chrominance bits 204, and the second chrominance bits 206 in the first pixel data 200, respectively.

The third pixel data 220 may comprise luma (Y or Y') bits 222 to control brightness associated with the pixel, partition, and/or image indicated by the third pixel data 220. The third pixel data 220 may comprise first chrominance (U or Cb or Pb) bits 214 to control a first color component associated with the pixel, partition, and/or image indicated by the third pixel data 220. The third pixel data 220 may comprise second chrominance (V or Cr or Pr) bits 226 to control a second color component associated with the third pixel data 220. The third pixel data 220 may indicate pixel data for another frame of the encoded video data, different than the frame of the second pixel data 210. The second pixel data 210 and the third pixel data 220 may indicate pixel data for the same frame of the encoded video data. The third pixel data 220 may indicate pixel data for another partition of the same frame, different than the partition of the second pixel data 210. The third pixel data 220 may reference other pixel data, although such dependency is not shown here.

The third pixel data 220 may be used as reference image data for the second pixel data 210. When decoded, the third pixel data 220 may be used as reference data to decode the second pixel data 210. When decoded, second pixel data 210 may reproduce the uncompressed first pixel data 200. Although, such reproduction may be imperfect—at least with respect to the first chrominance bits 214 and/or the second chrominance bits 216—due to any lossy compression that may occur in encoding the second pixel data 210 and/or the third pixel data 220. The third pixel data 220 may comprise spatial reference image data for the second pixel data 210. The third pixel data 220 may comprise temporal reference image data for the second pixel data 210. The third pixel data 220 may comprise spatial and temporal reference image data for the second pixel data 210. The second pixel data 210 may indicate (e.g., identify or reference) the third pixel data 220 as reference image data. The second pixel data 210 may indicate one or more of the first chrominance bits 224 and the second chrominance bits 226 as reference image data.

The first chrominance bits 214 of the second pixel data 210 (or other component of the second pixel data 210) may indicate (e.g., identify or reference) the first chrominance bits 224 of the third pixel data 220 as reference image data. Thus, the first chrominance bits 214 may comprise zero (0) bits of image data since a decoder (e.g., the decoder 112 in FIG. 1) may reference the third pixel data 220 and/or the first chrominance bits 224 of the third pixel data 220 to re-assemble the corresponding first chrominance bits 204 of the uncompressed first pixel data 200 in FIG. 2A (or best estimation thereof due to any lossy compression). The first chrominance bits 214 may still comprise other data besides any image data, such as header data, metadata, and/or reference data. The header data, metadata, reference data, etc. may be indicated by other bits of the second pixel data 210 rather than the first chrominance bits 214.

The second chrominance bits 216 of the second pixel data 210 (or other component of the second pixel data 210) may indicate (e.g., identify or reference) the second chrominance bits 226 of the third pixel data 220 as reference image data. Thus, the second chrominance bits 216 may comprise zero (0) bits of image data since a decoder may reference the third pixel data 220 and/or the second chrominance bits 226 of the third pixel data 220 to re-assemble the corresponding second chrominance bits 206 in the uncompressed first pixel data 200 in FIG. 2A (or best estimation thereof due to any lossy compression). The second chrominance bits 216 may still comprise other data besides any image data, such as header data, metadata, and/or reference data. The header data, metadata, reference data, etc. may be indicated by other bits of the second pixel data 210 rather than the second chrominance bits 216.

The luma bits 212 of the second pixel data 210 in the compressed video data may be determined based on the first pixel data 200 of FIG. 2A and/or on the luma bits 202 of the first pixel data 200. The luma bits 212 of the second pixel data 210 may be determined without reference to other pixel data, such as pixel data in the uncompressed video data (other than the first pixel data 200), the encoded third pixel data 220, and/or the third pixel data 220 in decoded form. The luma bits 212 of the second pixel data 210 may be determined without reference to luma bits of other pixel data, such as luma bits in the uncompressed video data (other than the luma bits 202 in the first pixel data 200), the luma bits 222 in the encoded third pixel data 220, and/or luma bits in the third pixel data 220 in decoded form. The luma bits 212 of the compressed second pixel data 210 may be determined without reference to luma bits of other pixel data of other partitions (encoded and/or decoded) of the same frame as the second pixel data 210.

In decoding the second pixel data 210, the decoder may determine luma bits 212 of the second pixel data 210 in decoded form without reference to luma bits of other encoded or decoded pixel data (other than the luma bits 202 in the first pixel data 200). A step of determining the luma bits 212 of the second pixel data 210 may exclude determining a best match (spatial and/or temporal) in other frames and/or other portions of the same frame in the uncompressed video data for the luma bits 202 of the first pixel data 200. The luma bits 212 of the encoded second pixel data 210 may inherit the luma bits 202 from the uncompressed first pixel data 200. An encoder (e.g., the encoder 104 in FIG. 1) may cause the luma bits 212 of the encoded second pixel data 210 to directly inherit the luma bits 202 from the uncompressed first pixel data 200. The luma bits 202 of the uncompressed first pixel data 200 may be carried over to the luma bits 212 of the encoded second pixel data 210. The luma bits 212 of the second pixel data 210 may be identical (e.g., unconditionally identical) to the luma bits 202 of the uncompressed first pixel data 200.

The luma bits 202, first chrominance bits 204, and second chrominance bits 206 of the first pixel data 200 each may comprise 10 bits of image data. Thus, the first pixel data 200 may comprise 30 bits of image data. The luma bits 212 of the second pixel data 210 may comprise 10 bits of image data. The first chrominance bits 214 and second chrominance bits 216 of the second pixel data 210 each may comprise 0 bits of image data. The first chrominance bits 214 and second chrominance bits 216 of the second pixel data 210 each may comprise 0 bits of image data due to the respective references to the first chrominance bits 224 and second chrominance bits 226 of the third pixel data 220. Thus, the second pixel data 210 may comprise bits of image data. The image data of the second pixel data 210 may comprise a quantity of bits (or other quantitative measure of data) equal or at least equal to the quantity of bits (or other quantitative measure of data) of the image data of the luma bits 202 of the first pixel data 200. It will be understood that the first pixel data 200 and the second pixel data 210 each may comprise other data besides image data. Thus, the first pixel data 200 may comprise more than 30 bits of data altogether. And the second pixel data 210 may comprise more than 10 bits of data altogether.

Figure 3:
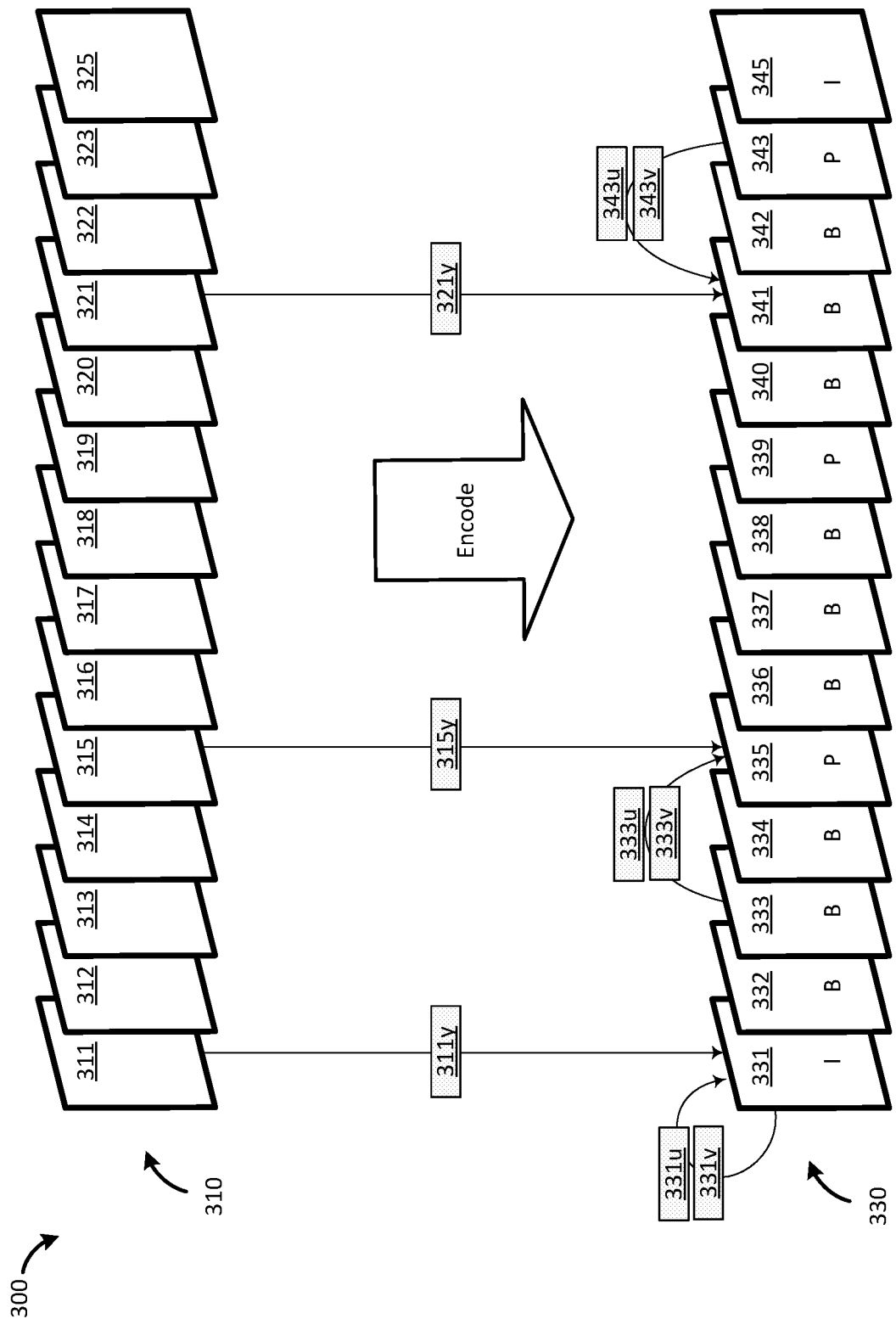
FIG. 3 shows an inter-frame encoding operation.

FIG. 3 shows video data 300 associated with a video encoding process. The video encoding process may comprise intra-frame and/or inter-frame encoding. Although the video data 300 and associated techniques are described with respect to frames, the disclosure is not so limited. The techniques described herein may be applied, additionally or alternatively, with respect to portions of a frame, such as partitions, macroblocks, blocks, slices, coding units, and/or pixels.

The video data 300 comprises an uncompressed (e.g., un-encoded) sequence 310 of frames. The uncompressed sequence 310 of frames comprises uncompressed frames 311-325. The video data 300 comprises an encoded sequence 330 of frames. The encoded sequence 330 of frames comprises encoded frames 331-345. The encoded sequence 330 of frames may be based on (e.g., correspond to) the uncompressed sequence 310 of frames. The uncompressed sequence 310 of frames may be subject to an encoding process to determine the encoded sequence 330 of frames.

The encoded frames 331-345 may be based on (e.g., correspond to) a respective frame of the uncompressed frames 311-325. Pixel data (e.g., for a frame portion) of a frame of the encoded frames 331-345 may be based on (e.g., correspond to) respective pixel data of the corresponding frame of the uncompressed frames 311-325. As examples, the encoded frame 331 may be based on (e.g., correspond to) the uncompressed frame 311, the encoded frame 335 may be based on (e.g., correspond to) the uncompressed frame 315, and the encoded frame 341 may be based on (e.g., correspond to) the uncompressed frame 321. As examples at the pixel data level, pixel data for a portion of the encoded frame 331 may be based on pixel data for a corresponding portion of the uncompressed frame 311, pixel data for a portion of the encoded frame 335 may be based on pixel data for a corresponding portion of the uncompressed frame 315, and pixel data for a portion of the encoded frame 341 may be based on pixel data for a corresponding portion of the uncompressed frame 321. An uncompressed frame and its corresponding encoded frame may indicate common video content (or a best estimate thereof). A portion of an uncompressed frame and a corresponding portion of an encoded frame may indicate common video content (or a best estimate thereof).

The encoded sequence 330 of frames may be organized as a group of pictures (GOP) in an IBBBP structure. An I (intra) frame (e.g., frame 331 and frame 345) is coded independently of other frames and, thus, may reference only itself. A P-frame (e.g., the frame 335, the frame 339, and the frame 343) may reference itself and/or reference pixel data from frames preceding the P-frame in display order. A B-frame (e.g., the frame 332, the frame 333, the frame 334, the frame 336, the frame 337, the frame 338, the frame 340, the frame 341, and the frame 342) may reference itself and/or other frames, in display order, before and/or after the B-frame.

Pixel data in each frame of the uncompressed sequence 310 of frames may comprise luma bits and chrominance bits (e.g., first chrominance bits and second chrominance bits). Pixel data in each frame of the encoded sequence 330 of frames may comprise luma bits and chrominance bits (first chrominance bits and second chrominance bits). The luma bits of pixel data of an encoded frame may be directly inherited from (e.g., be identical to) the luma bits of the corresponding pixel data of the corresponding uncompressed frame, such as via the encoding process. The first and second chrominance bits of a frame or portion thereof may reference other frames and/or other portions of the same frame.

Although FIG. 3 shows references for first and second chrominance bits pointing to the same frame, the disclosure is not so limited. First chrominance bits may refer to one frame and/or portion thereof while the associated second chrominance bits may refer to a different frame and/or portion thereof. FIG. 3 indicates luma, first chrominance, and second chrominance bits with appended characters y, u, and v, respectively. The disclosure, however, is not so limited and may apply to any color space additionally or alternatively to the YUV color space.

The luma bits (not shown) of the encoded (I) frame 331 may be directly inherited or carried over from the uncompressed frame 311. The luma bits of the encoded frame 331 may comprise luma bits 311y from the uncompressed frame 311. The luma bits of the encoded frame 331 may be identical to the luma bits 311y from the uncompressed frame 311. The luma bits of the encoded frame 331 may be associated with a portion of the encoded frame 331 and the luma bits 311y of the uncompressed frame 311 may be associated with a corresponding portion of the uncompressed frame 311. Since the encoded frame 331 is an I-frame, the first and second chrominance bits (not shown) of the encoded frame 331 may be based on (e.g., reference) pixel data of the encoded frame 331. The referenced chrominance pixel data may be that of a different portion of the encoded frame 331. The first chrominance bits of the encoded frame 331 may be based on first chrominance bits 331u of the encoded frame 331. The second chrominance bits of the encoded frame 331 may be based on second chrominance bits 331v of the encoded frame 331.

The luma bits (not shown) of the encoded (P) frame 335 may be directly inherited or carried over from the uncompressed frame 315. The luma bits of the encoded frame 335 may comprise luma bits 315y from the uncompressed frame 315. The luma bits of the encoded frame 335 may be identical to the luma bits 315y from the uncompressed frame 315. The luma bits of the encoded frame 335 may be associated with a portion of the uncompressed frame 315 and the luma bits 315y of the uncompressed frame 315 may be associated with a corresponding portion of the uncompressed frame 315. Since the encoded frame 335 is a P-frame, the first and second chrominance bits (not shown) of the encoded frame 335 may be based on (e.g., reference) pixel data of the preceding encoded frame 333. The first chrominance bits of the encoded frame 335 may be based on first chrominance bits 333u of the encoded frame 333. The second chrominance bits of the encoded frame 335 may be based on second chrominance bits 333v of the encoded frame 333.

The luma bits (not shown) of the encoded (B) frame 341 may be directly inherited or carried over from the uncompressed frame 321. The luma bits of the encoded frame 341 may comprise luma bits 321y from the uncompressed frame 321. The luma bits of the encoded frame 341 may be identical to the luma bits 321y from the uncompressed frame 321. Since the encoded frame 341 is a B-frame, the first and second chrominance bits (not shown) of the encoded frame 341 may be based on (e.g., reference) pixel data of the subsequent encoded frame 343. The first chrominance bits of the encoded frame 341 may be based on first chrominance bits 343u of the encoded frame 343. The second chrominance bits of the encoded frame 341 may be based on second chrominance bits 3431v of the encoded frame 343.

Figure 4A:
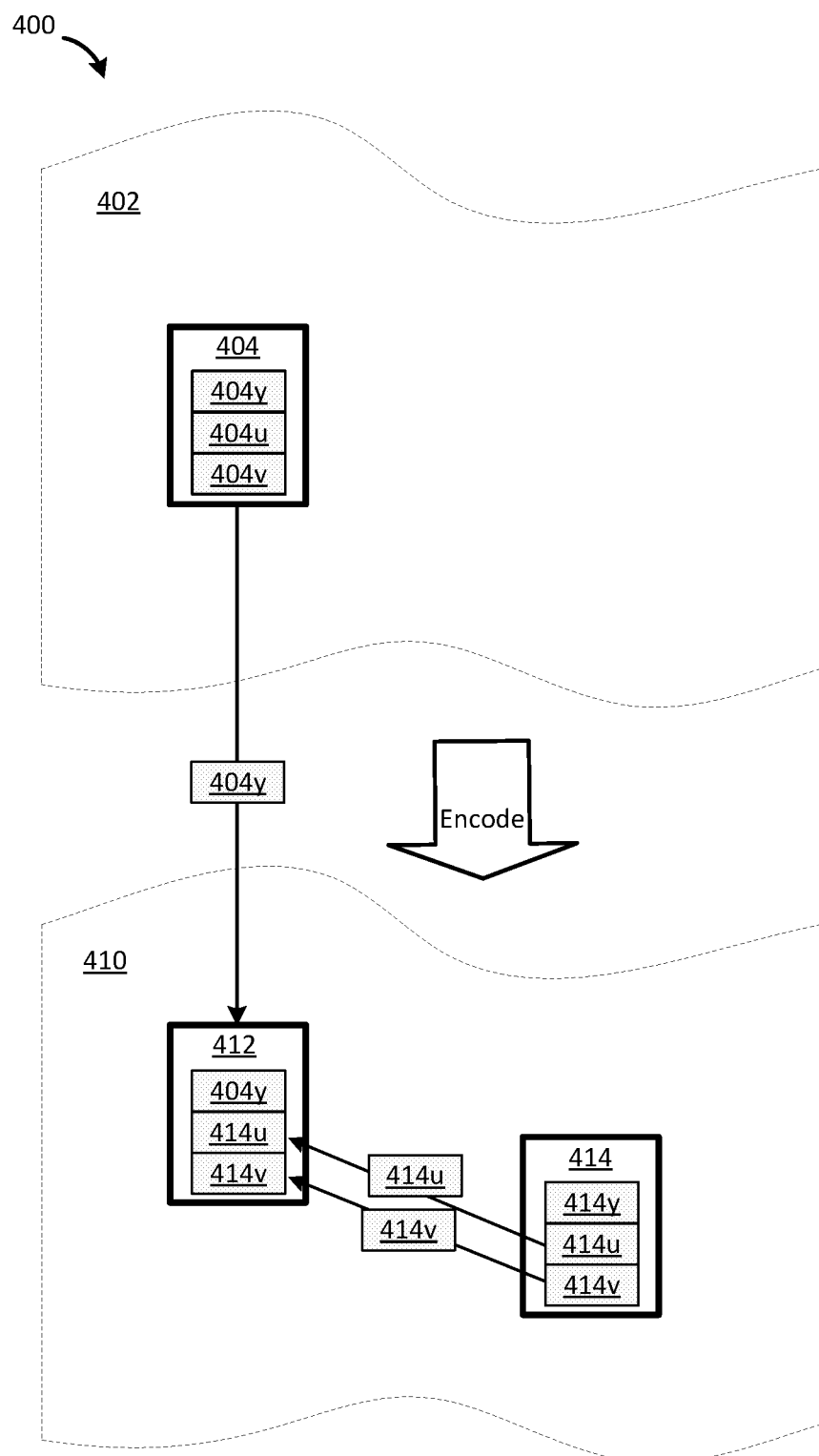
FIG. 4A shows an intra-frame encoding operation.
Figure 4B:
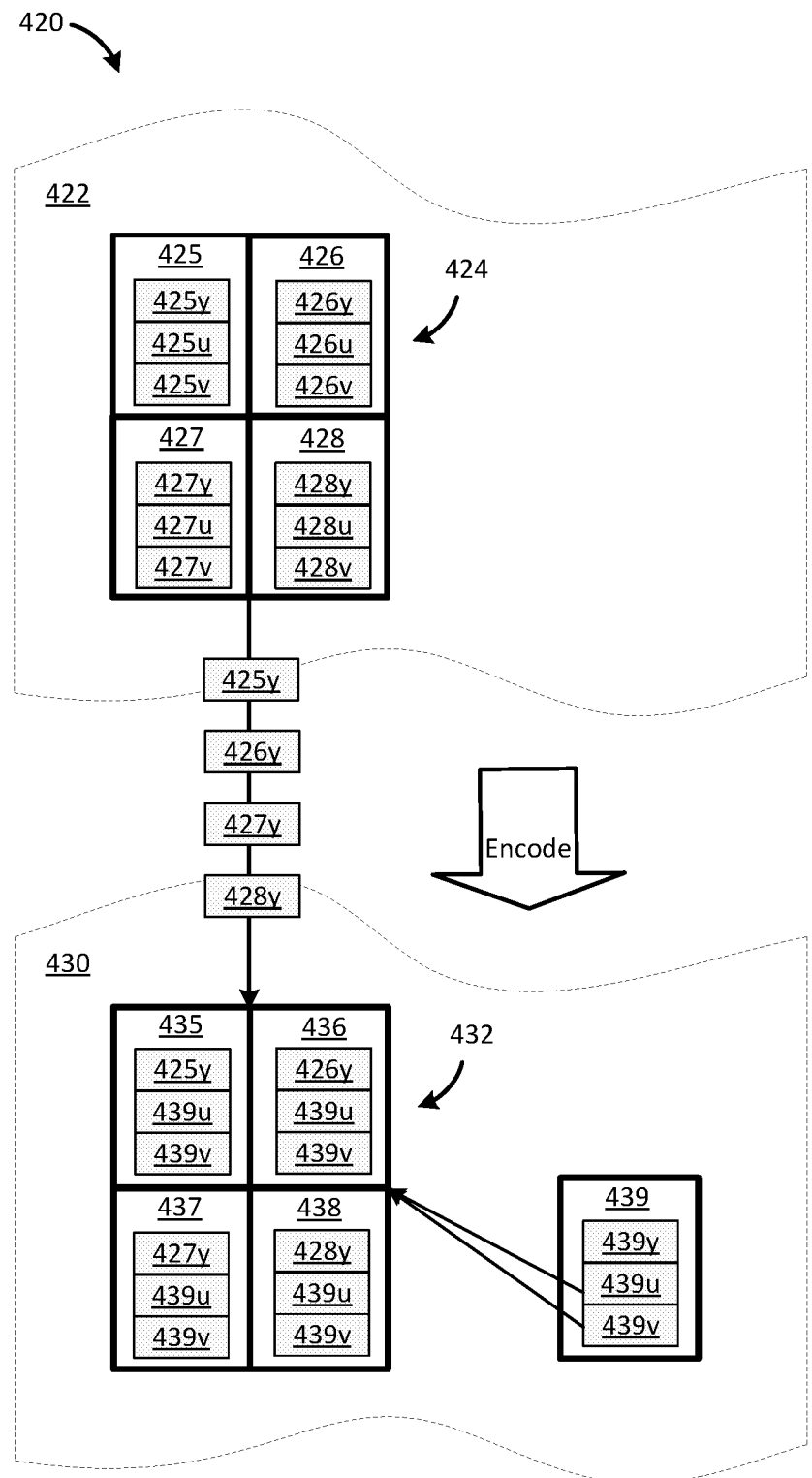
FIG. 4B shows an intra-frame encoding operation.
Figure 4C:
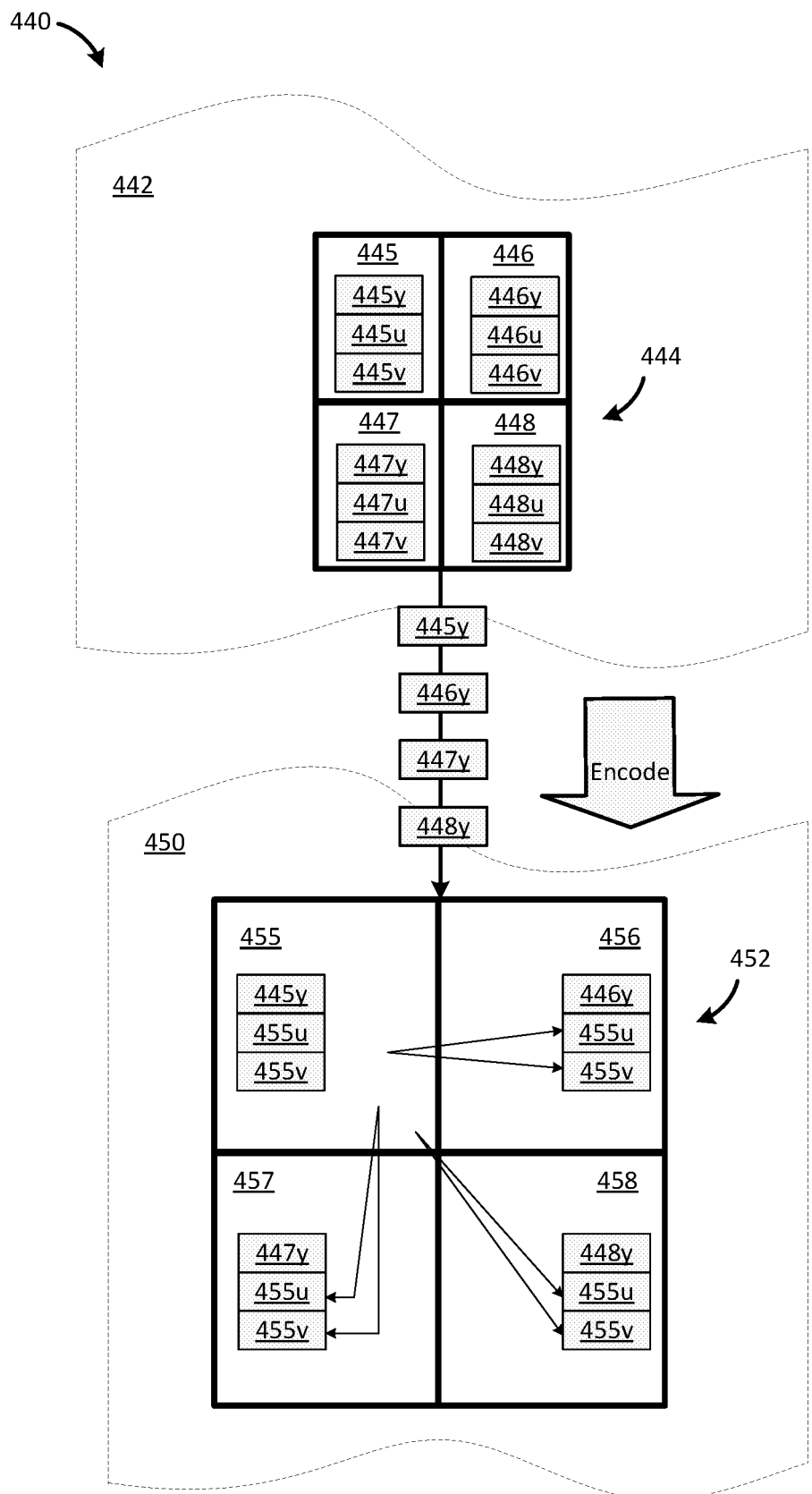
FIG. 4C shows an intra-frame encoding operation.

FIGS. 4A-4C show video data 400, 420, and 440 associated with one or more video encoding processes. The video encoding processes associated with the FIGS. 4A-4C may comprise intra-frame encoding. For a first portion of an uncompressed frame (e.g., a frame, partition, block, macroblock, slice, coding unit, and/or pixel, etc.) that is associated with pixel data, the encoding the portion may comprise determining a best match (e.g., spatial) within the uncompressed frame for the first portion. The best match need not be dimensioned equally to the first portion or be of the same type of partition as the first portion. The best match may be with respect to first chrominance bits and/or second chrominance bits. The determining the best match may exclude consideration of luma. Intra-frame encoding may comprise determining a best match with respect to first chrominance bits of pixel data for a frame portion and a another best match with respect to second chrominance bits for the same frame portion. The pixel data referenced with respect to FIGS. 4A-4C may indicate color spaces other than YUV.

The encoding may comprise determining first chrominance bits for portion of a frame. The pixel data of the encoded portion of the frame may reference the first chrominance bits of a best matching (with respect to the first chrominance) portion of the frame. The pixel data of the encoded portion of the frame may additionally or alternatively reference the second chrominance bits of a best matching (with respect to the second chrominance) portion of the frame. The first and second chrominance bits may reference different portions of the frame according to their respective best matches. The pixel data of the encoded portion of the frame may include luma bits. The luma bits of the pixel data of the encoded portion of the frame may be determined based on the luma bits of a portion of a corresponding uncompressed frame. The encoded portion of the frame may correspond to the portion of the uncompressed frame. The luma bits for the encoded portion of the frame may comprise the luma bits for the corresponding portion of the uncompressed frame. The luma bits for the encoded portion may be the same as the luma bits for the corresponding portion of the uncompressed frame.

FIG. 4A shows video data 400 associated with an intra-coding process. The video data 400 may comprise an uncompressed frame 402. The uncompressed frame 402 may be divided into a plurality of partitions (e.g., portions). The plurality of partitions may comprise an uncompressed partition 404. The uncompressed partition 404 may be associated with pixel data comprising luma bits 404y, first chrominance bits 404u, and second chrominance bits 404v.

The uncompressed frame 402 may be subject to an encoding process to determine an encoded frame 410. The encoded frame 410 may comprise a first encoded partition 412 and a second encoded partition 414. The first encoded partition 412 may correspond to the uncompressed partition 404 (e.g., indicate common video content or an estimate thereof). The pixel data associated with the second encoded partition 414 may comprise luma bits 414y, first chrominance bits 414u, and second chrominance bits 414v. The encoding process may comprise determining that the second encoded partition 414 may be a best match for the first encoded partition 412. The determining the best match may be based on the first and/or second chrominance bits of the first encoded partition 412 and the first and/or second chrominance bits of the second encoded partition 414, but not the luma bits of the first encoded partition 412 nor the luma bits of the second encoded partition 414.

The encoding process may comprise determining the luma bits of the first encoded partition 412 such that the luma bits of the first encoded partition 412 inherit the luma bits 404y of the uncompressed partition 404. The luma bits of the first encoded partition 412 may be the same as those of the uncompressed partition 404 of the uncompressed frame 402. The luma bits of the uncompressed partition 404 may carry over to the corresponding first encoded partition 412. The encoding the first encoded partition 412 may comprise determining the first chrominance bits of the first encoded partition 412 such that the first chrominance bits of the first encoded partition 412 reference the first chrominance bits 414u of the second encoded partition 414. The encoding the first encoded partition 412 may comprise determining the second chrominance bits of the first encoded partition 412 such that the first chrominance bits of the first encoded partition 412 reference the second chrominance bits 414v of the second encoded partition 414.

FIG. 4B shows video data 420 associated with an intra-coding process. The video data 420 may be similar in some aspects to the video data 400 of FIG. 4A. The video data 420 may comprise an uncompressed frame 422. The uncompressed frame 422 may be subject to an encoding process to determine an encoded frame 430.

The uncompressed frame 422 may comprise a plurality of uncompressed partitions 424, which may be adjacent to one another. The plurality of uncompressed partitions 424 may comprise an uncompressed partition 425, an uncompressed partition 426, an uncompressed partition 427, and an uncompressed partition 428. Each uncompressed partition of the plurality of uncompressed partitions 424 may be associated with pixel data comprising luma bits (luma bits 425y, luma bits 426y, luma bits 427y, and luma bits 428y, respectively), first chrominance bits (first chrominance bits 425u, first chrominance bits 426u, first chrominance bits 427u, and first chrominance bits 428u, respectively), and second chrominance bits (second chrominance bits 425v, second chrominance bits 426v, second chrominance bits 427v, and second chrominance bits 428v, respectively).

The encoded frame 430 may comprise a plurality of encoded partitions 432, which may be adjacent to one another. The plurality of encoded partitions 432 may correspond to the plurality of uncompressed partitions 424, as well as their respective constituent partitions. The plurality of encoded partitions 432 may comprise an encoded partition 435, an encoded partition 436, an encoded partition 437, and an encoded partition 438. Each encoded partition of the plurality of encoded partitions 432 may be associated with pixel data comprising respective luma bits, first chrominance bits, and second chrominance bits.

The encoding process may comprise determining the luma bits of each encoded partition of the plurality of encoded partitions 432 such that the luma bits of each encoded partition inherits the luma bits of the corresponding uncompressed partition of the plurality of uncompressed partitions 424. The encoded partition 435 may inherit the luma bits 425y of the uncompressed partition 425, encoded partition 436 may inherit the luma bits 426y of uncompressed partition 426, encoded partition 437 may inherit the luma bits 427y of the uncompressed partition 427, and encoded partition 438 may inherit the luma bits 428y of the uncompressed partition 428.

The encoding process may comprise determining that the encoded partition 439 of the encoded frame 430 is a best match for the collective plurality of partitions 432. The determining the best match may be with respect to first chrominance bits and/or second chrominance bits. The determining the best match may be without regard to luma bits. The first chrominance bits of the pixel data for each of the plurality of encoded partitions 432 may reference the first chrominance bits 439u of the encoded partitions 439. The second chrominance bits of the pixel data for each of the plurality of encoded partitions 432 may reference the second chrominance bits 439v of the encoded partition 439.

FIG. 4C shows video data 440 associated with an intra-coding process. The video data 440 may be similar in some aspects to the video data 400 of FIG. 4A and/or video data 420 of FIG. 4B. The video data 440 may comprise an uncompressed frame 442. The uncompressed frame 442 may be subject to an encoding process to determine an encoded frame 450.

The uncompressed frame 442 may comprise a plurality of uncompressed partitions 444, which may be adjacent to one another. The plurality of uncompressed partitions 444 may comprise an uncompressed partition 445, an uncompressed partition 446, an uncompressed partition 447, and an uncompressed partition 448. Each uncompressed partition of the plurality uncompressed partitions 444 may be associated with pixel data comprising luma bits (luma bits 445y, luma bits 446y, luma bits 447y, and luma bits 448y, respectively), first chrominance bits (first chrominance bits 445u, first chrominance bits 446u, first chrominance bits 447u, and first chrominance bits 448u, respectively), and second chrominance bits (second chrominance bits 455v, second chrominance bits 456v, second chrominance bits 457v, and second chrominance bits 458v, respectively).

The encoded frame 450 may comprise a plurality of encoded partitions 452, which may be adjacent to one another. The plurality of encoded partitions 452 may correspond to the plurality of uncompressed partitions 444, as well as their respective constituent partitions. The plurality of encoded partitions 452 may comprise an encoded partition 455, an encoded partition 456, an encoded partition 457, and an encoded partition 458. Each encoded partition of the plurality of encoded partitions 452 may be associated with pixel data comprising respective luma bits, first chrominance bits, and second chrominance bits.

The encoding process may comprise determining the luma bits of each encoded partition of the plurality of encoded partitions 452 such that the luma bits of each encoded partition inherits the luma bits of the corresponding uncompressed partition of the plurality of uncompressed partitions 444. The encoded partition 455 may inherit the luma bits 445y of the uncompressed partition 445, encoded partition 456 may inherit the luma bits 446y of the uncompressed partition 446, encoded partition 457 may inherit the luma bits 447y of uncompressed partition 447, and encoded partition 458 may inherit the luma bits 448y of the uncompressed partition 448.

The encoding process may comprise determining that the encoded partition 455 of the encoded plurality of partitions 452 is a best match for the other encoded partitions of the plurality of partitions 452. The determining the best match may be with respect to first chrominance bits and/or second chrominance bits. The determining the best match may be without regard to luma bits. The first chrominance bits of the pixel data for each of the plurality of encoded partitions 432, save the encoded partition 455, may reference the first chrominance bits 445u of the encoded partitions 455. The second chrominance bits of the pixel data for each of the plurality of encoded partitions 432, save the encoded partition 455, may reference the second chrominance bits 455v of the encoded partition 455.

Although FIG. 3 and FIGS. 4A-4C are shown with respect to spatial domain (e.g., explicit luma and/or chrominance values), inter-frame and/or intra-frame encoding processes may comprise frequency domain encoding. Inter-frame and/or intra-frame encoding process may comprise performing discrete cosine transform (DCT) processes. Encoding processes may comprise DCT processes, quantization processes, and/or entropy encoding processes. The entropy encoding processes may comprise run-length encoding. The entropy encoding processes may comprise variable length encoding. Decoding video data that was encoded according to such processes may comprise inverse transform processes and/or de-quantization processes. Transform and inverse transform processes and/or quantization and de-quantization processes may be performed with respect to chrominance components of video data, to the exclusion of luma values; luma values may remain the same between uncompressed and compressed video data.

Inter-frame best match determinations (e.g., as described in reference to FIG. 3) and/or intra-frame best match determinations (e.g., as described in reference to FIGS. 4A-4C) may be based on chrominance, to the exclusion of luma components (i.e., determine best matches based on chrominance rather than both chrominance and luma). Motion estimation, motion compensation, and/or motion vectors may be determined based on chrominance, to the exclusion of luma components (i.e., determine motion estimation, motion compensation, and/or motion vectors based on chrominance rather than both chrominance and luma).

Figure 5:
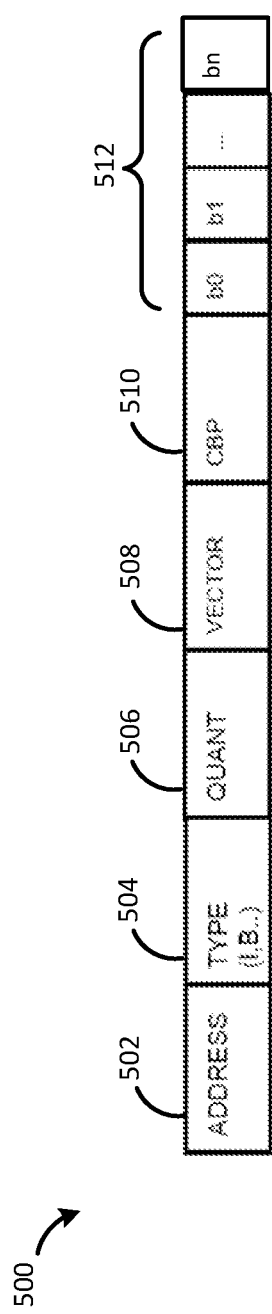
FIG. 5 shows an encoded video data structure.

FIG. 5 shows an encoded video data structure 500, such as what may be indicated in an encoded video stream. The data structure 500 may comprise an address field 502, a type field 504, a quantization field 506, a vector field 508, a coded block pattern field 510, and a plurality of bits 512 indicating picture data. The data structure 500 may indicate a pixel or a plurality of pixels (such as a block, a slice, a macroblock, etc.). A value in the address field 502 may indicate an index within a picture with which the data structure 500 is associated. The type field 504 may indicate a group of pictures (GOP) type associated with the data structure 500. The type field 504 may indicate I-frame, P-frame, B-frame, etc. The quantization field 506 may comprise a quantization value associated with the data structure 500. The quantization value may be calculated based on luma, to the exclusion of chrominance. The vector field 508 may indicate a motion vector associated with the data structure 500. The motion vector field 508 may indicate a motion vector associated with video data (e.g., one or more of the plurality of bits 512 of picture data) indicated by a particular instance of the data structure 500. The coded block pattern field 510 may comprise a bit mask indicating for which blocks coefficients are present in the data structure 500.

The plurality of bits 512 of picture data may comprise bits dedicated to luma data. The plurality of bits 512 of picture data may comprise optional bits for chrominance data. The plurality of bits 512 of picture data may comprise luma data but no chrominance data.

In performing a decoding process for an encoded video stream, a decoder (e.g., the decoder 112 in FIG. 1) may omit luma data in determining if picture data should be stored in a buffer (e.g., the buffer 114 in FIG. 1), such as for later use in decoding other video data in the encoded video stream. Because video data in the encoded video stream (e.g., video data indicating a partition of a frame) comprises luma bits inherited or carried over from the uncompressed, raw video data, (as opposed to using other frames and/or partitions as reference data for luma image data) the decoder or other logic system may leverage this fact to determine that no other encoded video data in the encoded video stream will require the instant luma bits as reference data to decode that encoded video data. By doing so, a smaller buffer may be required and/or other reference data may be stored in the buffer, allowing for more robust encoding techniques. The ability to store more of other, non-luma data in the buffer may allow use of reference frames that are farther away in display order than would otherwise be possible. The disclosed techniques may allow better performance at the decoder since the decoder does not need to execute logic to determine if luma data should be stored in the buffer.

Figure 6:
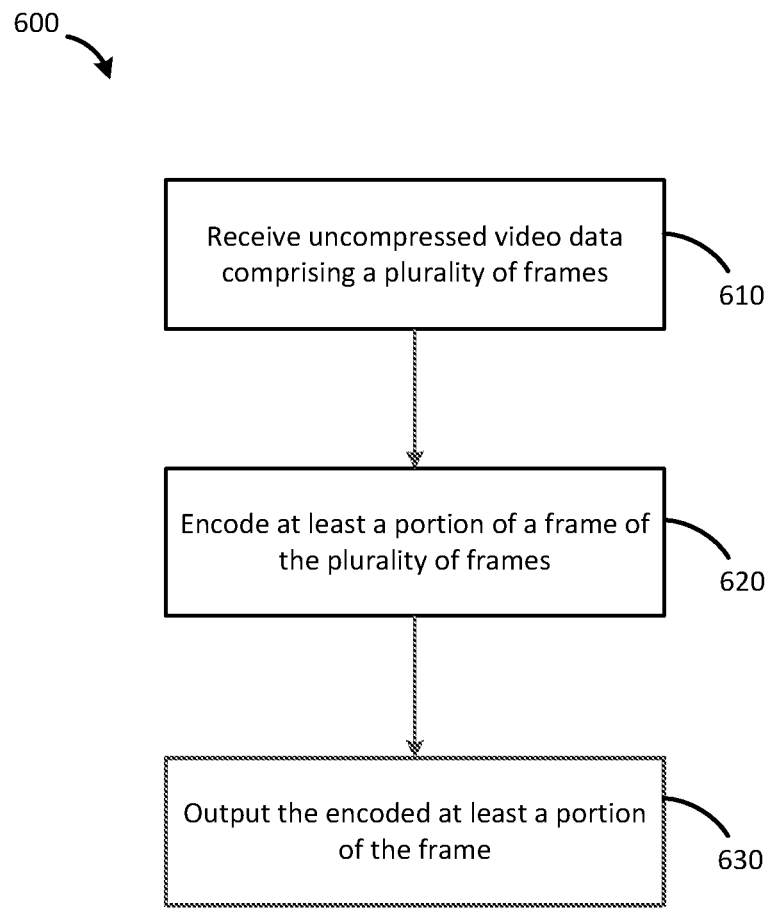
FIG. 6 shows a flow diagram of a method.

FIG. 6 shows a flow diagram 600 associated with video processing. At step 610, uncompressed video data comprising a plurality of frames may be received. The uncompressed video data may be received by an encoder (e.g., the encoder 104 in FIG. 1) from a video data source (e.g., the video data source 102 in FIG. 1). The video data may comprise a movie, a show, a sporting event, a musical event, a segment of a longer program, a music video, a commercial, and/or the like, or any combination of the foregoing.

At step 620, at least a portion of a frame of the plurality of frames may be encoded. The at least a portion of the frame may be encoded by the encoder. The encoding the at least a portion of the frame may comprise determining a first chrominance component of a first pixel of the frame. The first chrominance component of the first pixel may be based on a first chrominance component of an encoded second pixel. Encoding the at least a portion of the frame may comprise determining the first chrominance component of the first pixel and a second chrominance component of the first pixel. The second chrominance component of the first pixel may be based on a second chrominance component of an encoded second pixel.

The encoded second pixel may be from the same frame as that of the first pixel (i.e., the frame of the plurality of frames). The first pixel may be from a first partition of the frame and the encoded second pixel may be from a second, different partition of the same frame. The encoded second pixel may be from a different frame as that of the first pixel (i.e., a second frame of the plurality of frames). The second frame may be already encoded. The encoded second pixel may be from a partition of the second frame (i.e. a second partition of the second frame). The second partition of the second frame may correspond to the partition comprising the first pixel of the frame comprising the first pixel. The second partition of the second frame and the partition comprising the first pixel may indicate common video content.

The first pixel, the partition comprising the first pixel, and/or the frame comprising the first pixel may be subsequent, in encoding order, to the second pixel, the second partition, and/or the second frame, respectively. The second frame may be before, in display order, to the frame comprising the first pixel. The frame comprising the first pixel may be a P-frame. The second frame may be subsequent, in display order, to the frame comprising the first pixel. The frame comprising the first pixel may be a B-frame.

A partition of a frame may comprise a block, macroblock, slice, a coding unit, and/or a pixel. The type of partition may be based on an associated encoding standard. A partition may be a slice under Advance Video Coding (AVC/H.264). A partition may be a macroblock under High Efficiency Video Coding (HEVC/H.265).

Determining the first (and/or second) chrominance component of the first pixel may comprise performing a best match search based on the first pixel and/or the second pixel. The best match search may be based on the respective first (and/or second) chrominance component of the first pixel and/or the second pixel, exclusive of a respective luma component of the first pixel and/or second pixel. The performing the best match search may comprise a motion estimation associated with the second pixel. The motion estimation may be based on the first (and/or second) chrominance component of the second pixel, exclusive of the luma component of the second pixel.

The encoding the at least a portion of the frame may comprise determining a luma component of the first pixel. The luma component of the first pixel may correspond to a luma component of a corresponding pixel from the uncompressed video data. The luma component of the first pixel may be the same as the luma component of the corresponding pixel from the uncompressed video data. The luma component of the corresponding pixel from the uncompressed video data may be carried over in the encoding process to the luma component of the first pixel.

The encoding the at least a portion of the frame may comprise determining a second chrominance component of the first pixel. The second chrominance component of the first pixel may be based on a second chrominance component of the second pixel. The second chrominance component of the first pixel may be based on a chrominance component of a third encoded pixel, different from the second pixel.

The encoding the at least a portion of the frame may comprise performing a DCT process, quantization process, and/or entropy encoding process on a partition comprising the first pixel. The DCT process, quantization process, and/or entropy encoding process may be based on a respective chrominance component of each pixel of the partition, exclusive of a respective luma component of each pixel of the partition.

A partition may comprise a plurality of pixels. The plurality of pixels may comprise the first pixel. The determining the first chrominance component of the first pixel may comprise determining a chrominance component associated with the partition. A respective chrominance component of each pixel of the partition may be based on the chrominance component associated with the partition.

At step 630, the encoded at least a portion of the frame may be output. The encoder may output the encoded at least a portion of the frame. Outputting the encoded at least a portion of the frame may comprise transmitting the encoded at least a portion of the frame to a video archive system (e.g., the video archive system 120 in FIG. 1) for storage by the archive/storage system. The outputting the encoded at least a portion of the frame may comprise transmitting the encoded at least a portion of the frame as an encoded video stream. The encoded video stream may be transmitted to and received by a client device (e.g., the client device 110 of FIG. 1) for playback.

Figure 7:
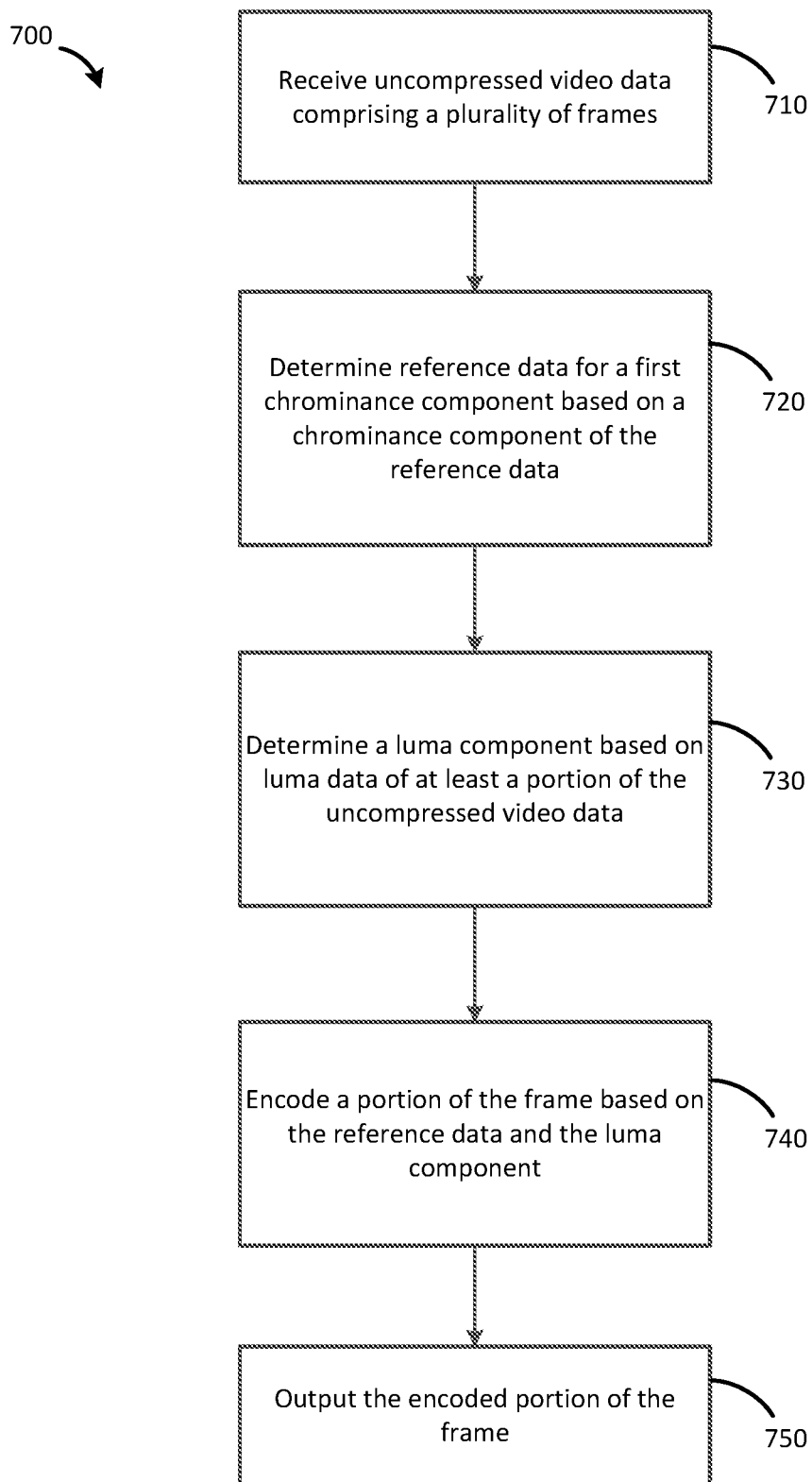
FIG. 7 shows a flow diagram of a method.

FIG. 7 shows a flow diagram 700 associated with video processing. At step 710, uncompressed video data comprising a plurality of frames may be received. The uncompressed (e.g., un-encoded) video data may be received by an encoder (e.g., the encoder 104 in FIG. 1) from a video data source (e.g., the video data source 102 in FIG. 1).

At step 720, reference data for a chrominance component (e.g. one or more of a first chrominance component and a second chrominance component) may be determined. The reference data may be determined based on a chrominance component of the reference data. The reference data may be used to indicate a chrominance component of another pixel, partition, and/or frame (i.e., a first pixel, partition, and/or frame). The reference data may comprise a reference pixel, a reference pixel, and/or a reference frame. Reference data may be encoded reference data. The first pixel, partition, and/or frame may be encoded video data. The encoded reference data and the encoded first pixel, partition, and/or frame may be part of an encoded video stream or other structure of encoded video data.

The reference data may be a pixel of the same frame as the first pixel, partition, and/or frame. The reference data may be a pixel of a frame different than that comprising the first pixel, partition, and/or frame. The reference data may be a pixel of the same partition as the first pixel, partition, and/or frame. The reference data may be a pixel of a partition different than that comprising the first pixel, partition, and/or frame. The reference data may be a partition of the same frame as the first pixel, partition, and/or frame. The reference data may be a partition of a frame different than that comprising the first pixel, partition, and/or frame. The reference data may be the same frame as that comprising the first pixel, partition, and/or frame. The reference data may be a frame different than that comprising the first pixel, partition, and/or frame.

At step 730, a luma component for the first pixel, partition, and/or frame may be determined based on luma data of at least a portion of the uncompressed video data. The luma component for the first pixel may be determined based on the luma data of the at least a portion of the uncompressed video data, exclusive of chrominance data of the at least a portion of the uncompressed video data. The luma component of the first pixel, partition, and/or frame may be the same as the luma component of the at least a portion of the uncompressed video data. Determining the luma component of the first pixel, partition, and/or frame may comprise carrying over, without changing, the luma component of the at least a portion of the uncompressed video data to the luma component of the first pixel, partition, and/or frame. The at least a portion of the uncompressed video data may comprise a pixel, a partition, and/or a frame of the uncompressed video data. The at least a portion of the uncompressed video data may correspond to the first pixel, partition, and/or frame. The at least a portion of the uncompressed video data may indicate common video content as the first pixel, partition, and/or frame.

At step 740, a portion of a frame comprising the first pixel, partition, and/or frame may be encoded. The encoding may be based on the reference data for the chrominance component and the luma component from the at least a portion of the uncompressed video data. The encoded portion of the frame comprising the first pixel, partition, and/or frame may be part of a stream of encoded video data or other encoded video data structure. The encoder may encode the portion of the frame comprising the first pixel, partition, and/or frame. The portion of the frame may be encoded according to HEVC, AVC, and/or other standards. The encoded portion of the frame may comprise data indicating the reference data (e.g., the reference pixel, partition, and/or frame). The reference data may be part of the portion of the frame in the stream of encoded video data or other encoded video data structure. The reference data may be part of the stream of encoded video data or other encoded video data structure but not part of the portion of the frame.

Data (e.g., a header, metadata, or other reference information) associated with the first pixel, partition, and/or frame may indicate (e.g., identify) the reference data in the encoded video data. The data associated with the encoded first pixel, partition, and/or frame may be part of the encoded video data. The data associated with the encoded first pixel, partition, and/or frame may indicate that a chrominance component of the first pixel, partition, and/or frame may be based on the chrominance component of the reference data. The data associated with the encoded first pixel, partition, and/or frame may indicate that the reference data, in decoded form, may be used to decode the other pixel, partition, and/or frame with respect to chrominance.

At step 750, the encoded portion of the frame comprising the first pixel, partition, and/or frame may be output. The encoder may output the encoded portion of the frame. The outputting the encoded portion of the frame may comprise transmitting the encoded portion of the frame to a video archive system (e.g., the video archive system 120 in FIG. 1) for storage by the archive/storage system. The outputting the encoded portion of the frame may comprise transmitting the encoded portion of the frame as an encoded video stream. The encoded video stream may be transmitted to and received by a client device (e.g., the client device 110 of FIG. 1) for playback.

Figure 8:
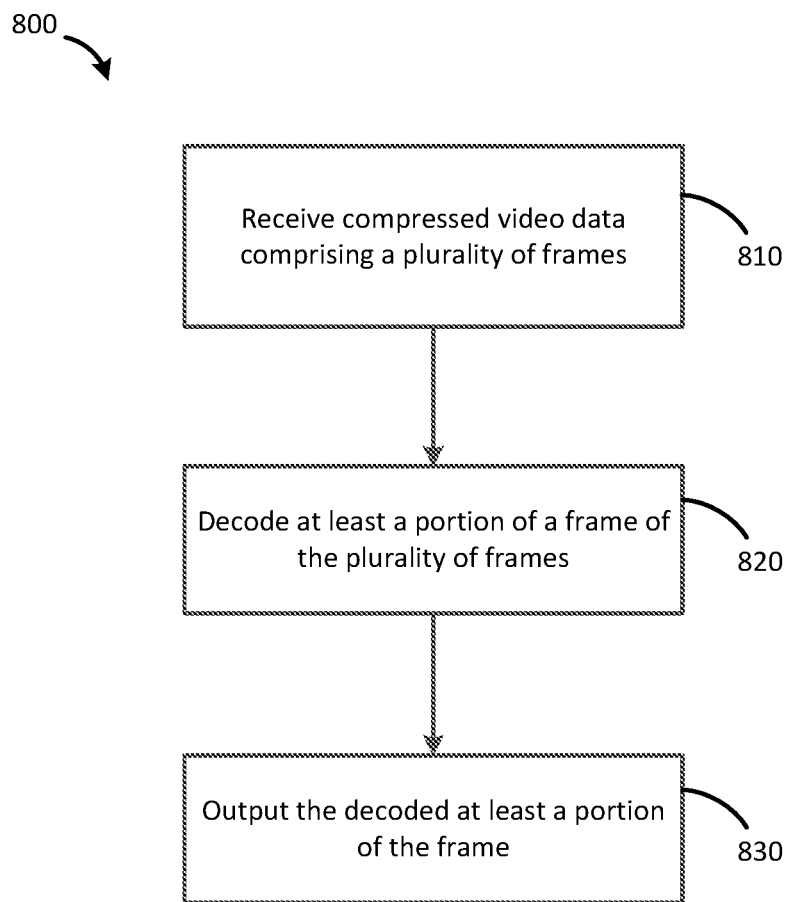
FIG. 8 shows a flow diagram of a method.

FIG. 8 shows a flow diagram 800 associated with video processing. At step 810, encoded (i.e., compressed) video data comprising a plurality of frames may be received. A video archive system (e.g., the video archive system 120 in FIG. 1) may receive the encoded video data. A client device (e.g., the client device 110 in FIG. 1) may receive the encoded video data. The encoded video data may be received from an encoder (e.g., the encoder 104 in FIG. 1) and or the video archive system. The video data may comprise a movie, a show, a sporting event, a musical event, a segment of a longer program, a music video, a commercial, and/or the like, or any combination of the foregoing. The encoded video data may be received as an encoded video stream and/or other data structure for encoded video data.

At step 820, a portion of a frame of the plurality of frames may be decoded. The client device and/or a decoder of the client device (e.g., the decoder 112 in FIG. 1) may decode the portion of the frame of the plurality of frames. The decoding the portion of the frame may comprise determining a first chrominance component of a first pixel of the at least a portion of the frame. The first chrominance component of the first pixel may be based on a first chrominance component of a second, already-decoded pixel. The second pixel be received as part of the encoded video stream or other data structure comprising the first pixel.

The decoding the portion of the frame may comprise determining a second chrominance component of the first pixel. The second chrominance component of the first pixel may be based on a second chrominance component of the second pixel. The second chrominance component of the first pixel may be based on a second chrominance component of a third, already-decoded pixel. The second pixel may be from the frame of the plurality of frames. The second pixel may be from a second frame of the plurality of frames. The second pixel may be from the first frame (i.e., the same frame) of the plurality of frames. The second pixel may be from a partition of the first frame different from the partition of the first frame comprising the first pixel.

The second pixel may be stored as reference data in a buffer (e.g., the buffer 114 in FIG. 1) associated with decoding the portion of the frame. A partition comprising the second pixel may be stored in the buffer. A frame comprising the second pixel may be stored as reference data in the buffer. The second pixel may be decoded and stored in the buffer as part of the same decoding process that decodes the portion of the frame. The second pixel (and/or associated second partition and/or second frame, as applicable) may be prior to the first pixel in decoding order. The second pixel (and/or associated second partition and/or second frame, as applicable) may be subsequent to and/or prior to the first pixel in display order. The frame comprising the first pixel may be an I-frame, a B-frame, and/or a P-frame with respect to the frame of the second pixel.

The second pixel stored in the buffer may comprise chrominance components but no luma components. The decoding the portion of the frame may comprise copying (or otherwise representing) the first (and/or second) chrominance component of the second pixel, exclusive of a luma component of the second pixel, to the buffer. The decoding the portion of the frame may comprise decoding the second frame comprising the second pixel and/or the second partition comprising the second pixel such that the resultant decoded second frame stored in the buffer comprises chrominance components but no luma components.

Determining a (first and/or second) chrominance component of the first pixel may comprise performing a motion compensation operation based on the chrominance component of the second pixel, exclusive of a luma component of the second pixel. The motion compensation operation may be further based on a motion vector associated with the second pixel and a prediction error associated with the second pixel. The motion vector and/or the prediction error may relate to the chrominance component of the second pixel.

The decoding the portion of the frame may comprise determining a luma component of the first pixel. The luma component may be indicated explicitly in the encoded video data received by the client device/decoder. That is, the luma component may be indicated in the encoded video data without reference to other pixels, partitions, or frames in the encoded video data. The determining the luma component of the first pixel may comprise copying or replicating, in the luma component of the first pixel, the luma component indicated in the encoded video data. The luma component of the first pixel may be set, such as by the decoder, to match the luma component indicated in the encoded video data. The luma component of the decoded first pixel may be a lossless reproduction of the luma component of the corresponding pixel in the original uncompressed video data from which the encoded video data was determined. The luma component indicated in the encoded video data may have been directly inherited from the corresponding luma component in the uncompressed video data from which the encoded video data from determined.

The first pixel may be part of a partition of the portion of the frame. The partition may comprise a block, a macroblock, a slice, a frame, and/or other types of partitions. The partition of the portion of the frame may comprise a plurality of pixels, including the first pixel. Determining the first (and/or second) chrominance component of the first pixel may comprise determining a chrominance component associated with the partition. The chrominance component associated with the partition may be determined based on the decoded second pixel stored in the buffer (e.g., based on a chrominance component of the second pixel). The chrominance component associated with the partition comprising the first pixel may be determined based on a chrominance component associated with a partition of decoded video data comprising the second pixel. A respective chrominance component of each pixel of the partition comprising the first pixel may be based on the chrominance component associated with the partition comprising the first pixel.

Decoding the portion of the frame may comprise decoding a partition of the frame. The partition of the frame may comprise a plurality of pixels, including the first pixel. Decoding the partition of the frame may comprise determining a respective first (and/or second) chrominance component for each pixel of the plurality of pixels of the partition of the frame. Decoded video data stored in the buffer may comprise a decoded partition that corresponding to the partition of the frame. The decoded partition may comprise a plurality of decoded pixels, including the second pixel. Each decoded pixel of the plurality of decoded pixels may indicate one or more chrominance components, but no luma component. The respective chrominance component of each pixel of the plurality of pixels of the partition of the frame may be determined based on a chrominance component of a corresponding pixel of the plurality of decoded pixels of the decoded partition.

Decoding the partition of the frame may comprise determining a respective luma component for each pixel of the plurality of pixels of the partition of the frame. The respective luma component for each pixel may be determined based on a corresponding luma component explicitly identified in the encoded video data. The respective luma component for each pixel of the plurality of pixels of the partition of the frame may be determined by copying or otherwise replicating the corresponding luma component identified in the encoded video data. The respective luma component for each pixel of the plurality of pixels of the partition of the frame may be determined without reference to decoded video data, such as that stored in the buffer.

At step 830, the decoded portion of the frame may be output. The client device or component thereof (e.g., the decoder and/or the video player) may output the decoded portion of the frame. A display (e.g., the display 118 in FIG. 1) may output the decoded portion of the frame. The decoded portion of the frame may be output for consumption by a user.

Figure 9:
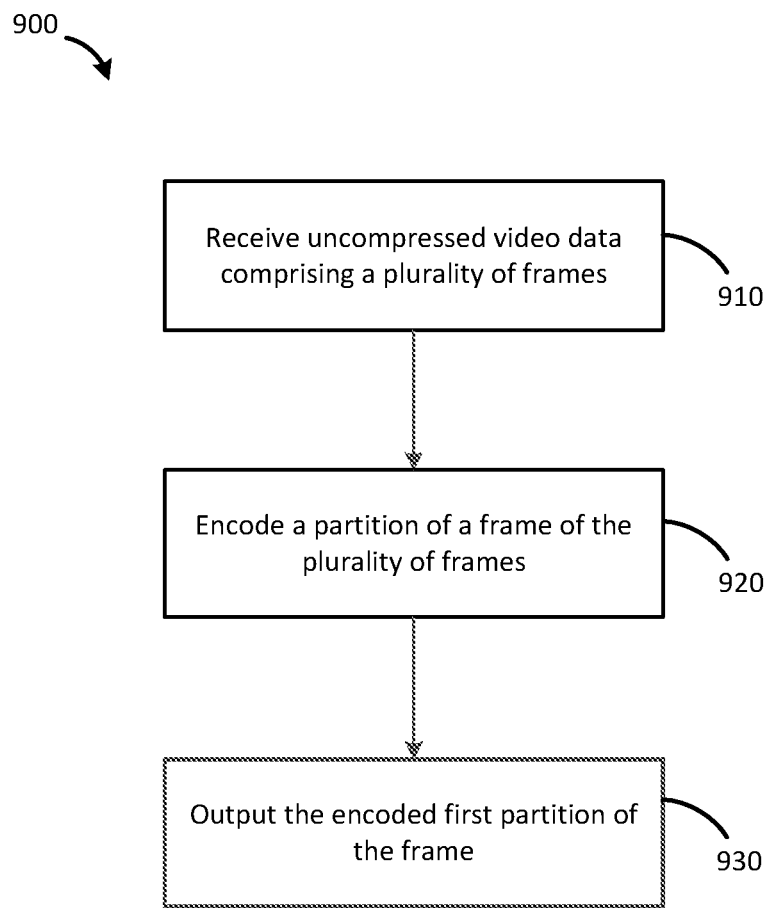
FIG. 9 shows a flow diagram of a method.

FIG. 9 shows a flow diagram 900 associated with processing video. At step 910, uncompressed video data comprising a plurality of frames may be received. The uncompressed video data may be received by an encoder (e.g., the encoder 104 in FIG. 1) from a video data source (e.g., the video data source 102 in FIG. 1). The video data may comprise a movie, a show, a sporting event, a musical event, a segment of a longer program, a music video, a commercial, and/or the like, or any combination of the foregoing.

At step 920, a partition of the frame of the plurality of frame may be encoded. The partition of the frame may be encoded by the encoder. A partition of a frame may comprise a frame, a block, a macroblock, a slice, a coding unit, and/or a pixel. Encoding the partition of the frame may comprise determining a first chrominance component of the partition. The first chrominance component of the partition may be based on a first chrominance component of a encoded second partition. Encoding the partition of the frame may comprise determining the first chrominance component of the partition and a second chrominance component of the partition. The second chrominance component of the partition may be based on a second chrominance component of the encoded second partition.

The encoded second partition may be from the same frame as that of the first partition (i.e., the frame of the plurality of frames). The second partition may be from a second, different frame of the plurality of frames. The second frame may be already encoded. The second partition from the second frame and the first partition may indicate common video content.

Determining the first (and/or second) chrominance component of the first partition may comprise performing a best match search based on the first partition and/or the second partition. The best match search may be based on the respective first (and/or second) chrominance component of the first partition and/or the second partition, exclusive of a respective luma component of the first partition and/or second partition. Performing the best match search may comprise a motion estimation associated with the second partition. The motion estimation may be based on the first (and/or second) chrominance component of the second partition, exclusive of the luma component of the second partition.

Encoding the first partition may comprise determining a luma component of the first partition. The luma component of the first partition may correspond to a luma component of a corresponding partition from the uncompressed video data. The luma component of the first partition may be the same as the luma component of the corresponding partition from the uncompressed video data. The luma component of the corresponding partition from the uncompressed vide data may be carried over in the encoding process to the luma component of the first partition.

Encoding the first partition of the frame may comprise determining a second chrominance component of the first partition. The second chrominance component of the first partition may be based on a second chrominance component of the second partition. The second chrominance component of the first partition may be based on a chrominance component of a third encoded partition, different from the second partition.

Encoding the first partition of the frame may comprise performing a DCT process, quantization process, and/or entropy encoding process on the first partition. The DCT process, quantization process, and/or the entropy encoding process may be based on the first and/or second chrominance component of the first partition, exclusive of the luma component of the partition. The DCT process, quantization process, and/or entropy encoding process may be based on a respective chrominance component of each pixel of the first partition, exclusive of a respective luma component of each pixel of the first partition.

At step 930, the encoded first partition of the frame may be output. The encoder may output the encoded first partition. Outputting the encoded first partition may comprise transmitting the encoded first partition to a video archive system (e.g., the video archive system 120 in FIG. 1) for storage by the video archive system. Outputting the encoded first partition may comprise transmitting the encoded first partition as an encoded video stream. The encoded video stream may be transmitted to and received by a client device (e.g., the client device 110 of FIG. 1) for playback.

A user may request video content from a content provider. The requested video content may be retrieved, as uncompressed video data, from a video data source and/or a video archival system. The requested video content may be encoded in such a manner that the luma components of the encoded video data are the same as those in the uncompressed video data. The luma components may not be indicated in the encoded video data via reference data. Rather, only chrominance components may be indicated in the encoded video data. The requested video content may be transmitted, as the encoded video data, to a client device associated with the user. The client device may comprise a decoder. The decoder may decode the encoded video data to determine the decoded, requested video content. To decode the encoded video data, the decoder may access reference data stored in the decoder's buffer. The reference data stored in the buffer may comprise chrominance data but not luma data. The decoder instead may access luma data in the encoded video data to determine the luma components of the decoded video content. The client device may comprise a video player and a display. The video player and the display may play the requested video content.

A content provider may archive video content. The content provider encode the video content such that the size of the encoded video content is reduced but the encoded video content closely resemble the original uncompressed video content. The content provider may cause the video content to be encoded such that the luma values from the uncompressed video content are retained in the resulting encoded video content. The content provider may cause the encoded video content to be stored in a database associated with an video archive system.

Figure 10:
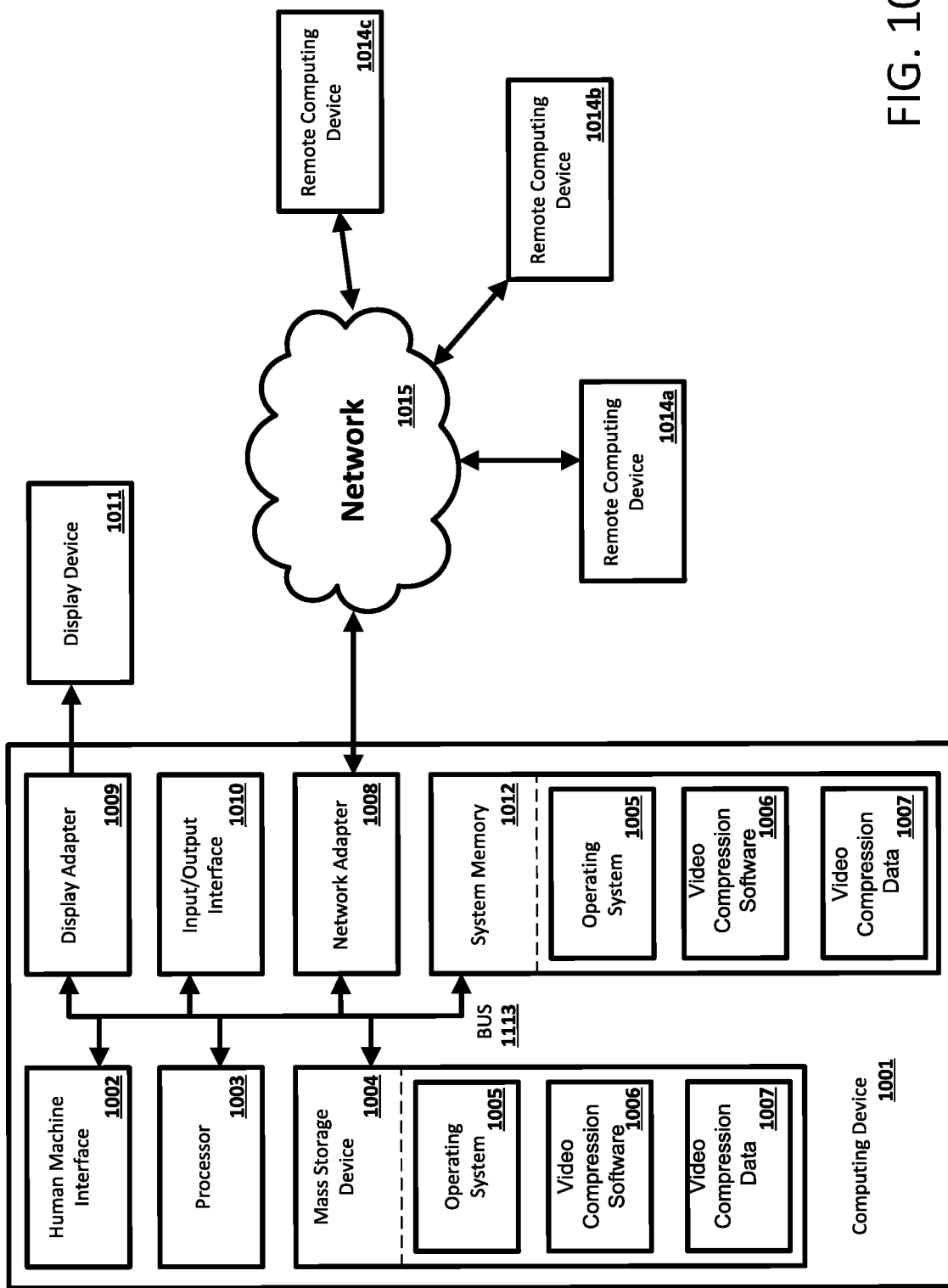
FIG. 10 shows a block diagram of a computing environment.

The systems, methods, and apparatuses described herein may be implemented on a computing device such as a computing device 1001 (e.g., computer) as shown in FIG. 10 and described below. The encoder 104, the decoder 112, the video archive system 120, and the client device 110 may be and/or comprise a computing device as shown in FIG. 10. Similarly, the methods, systems, and apparatuses disclosed may utilize one or more computing device to perform one or more functions in one or more locations. FIG. 10 is a block diagram showing an operating environment for performing the disclosed methods, systems, and apparatuses. This operating environment is not intended to suggest any limitation as to the scope of use or functionality of operating environment architecture. Neither should the operating environment be interpreted as having any dependency or requirement relating to any one or combination of components shown in the operating environment.

The systems, methods, and apparatuses described herein may be operational with numerous other general purpose or special purpose computing system environments or configurations. Computing systems, environments, and/or configurations that may be suitable for use with the systems, methods, and apparatuses comprise, but are not limited to, personal computers, server computers, laptop devices, and multiprocessor systems. Set top boxes, programmable consumer electronics, network PCs, minicomputers, mainframe computers, distributed computing environments that comprise any of the above systems or devices, and the like may be used to implement the methods, systems, and apparatuses.

The systems, methods, and apparatuses may be implemented, in whole or in part, by software components. The disclosed methods, systems, and apparatuses may be described in the general context of computer-executable instructions, such as program modules, being executed by one or more computers or other devices. Generally, program modules comprise computer code, routines, programs, objects, components, data structures, etc. that perform particular tasks or implement particular abstract data types. The methods, systems, and apparatuses may be practiced in grid-based and distributed computing environments where tasks are performed by remote processing devices that are linked through a communications network. In a distributed computing environment, program modules may be located in both local and remote computer storage media including memory storage devices.

The methods, systems, and apparatuses may be implemented via a general-purpose computing device in the form of a computing device 1001. The components of the computing device 1001 may comprise, but are not limited to, one or more processors 1003, a system memory 1012, and a system bus 1013 that couples various system components including the processor 1003 to the system memory 1012. With multiple processors 1003, the system may utilize parallel computing.

The system bus 1013 represents one or more of several possible types of bus structures, including a memory bus or memory controller, a peripheral bus, an accelerated graphics port, and a processor or local bus using any of a variety of bus architectures. Such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 1013, and all buses specified in this description may be implemented over a wired or wireless network connection and each of the subsystems, including the processor 1003, a mass storage device 1004, an operating system 1005, a video compression software 1006, a video compression data 1007, a network adapter 1008, system memory 1012, an Input/Output Interface 1010, a display adapter 1009, a display device 1011, and a human machine interface 1002, may be contained within one or more remote computing devices 1014a,b,c at physically separate locations, connected through buses of this form, in effect implementing a fully distributed system.

The computing device 1001 typically comprises a variety of computer readable media. Readable media may be any available media that is accessible by the computing device 1001 and comprises both volatile and non-volatile media, removable and non-removable media. The system memory 1012 comprises computer readable media in the form of volatile memory, such as random access memory (RAM), and/or non-volatile memory, such as read only memory (ROM). The system memory 1012 typically contains data such as video compression data 1007 and/or program modules such as operating system 1005 and video compression software 1006 that are immediately accessible to and/or are presently operated on by the processor 1003.

The computing device 1001 may comprise other removable/non-removable, volatile/non-volatile computer storage media. FIG. 10 shows a mass storage device 1004 which may provide non-volatile storage of computer code, computer readable instructions, data structures, program modules, and other data for the computing device 1001. A mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 1004, including an operating system 1005 and video compression software 1006. Each of the operating system 1005 and video compression software 1006 (or some combination thereof) may comprise elements of the programming and the video compression software 1006. Video compression data 1007 may be stored on the mass storage device 1004. Video compression data 1007 may be stored in any of one or more databases known in the art. Such databases may comprise, DB2®, Microsoft® Access, Microsoft® SQL Server, Oracle®, mySQL, PostgreSQL, and the like. The databases may be centralized or distributed across multiple systems.

The user may enter commands and information into the computing device 1001 via an input device (not shown). Input devices may comprise, but are not limited to, a keyboard, pointing device (e.g., a "mouse"), a microphone, a joystick, tactile input devices such as gloves, and other body coverings, and the like. These and other input devices may be connected to the processor 1003 via a human machine interface 1002 that is coupled to the system bus 1013, but may be connected by other interface and bus structures, such as a parallel port, game port, an IEEE 1394 Port (also known as a Firewire port), a serial port, or a universal serial bus (USB).

A display device 1011 may be connected to the system bus 1013 via an interface, such as a display adapter 1009. It is contemplated that the computing device 1001 may have more than one display adapter 1009 and the computing device 1001 may have more than one display device 1011. A display device may be a monitor, an LCD (Liquid Crystal Display), or a projector. Output peripheral devices may comprise components such as speakers (not shown) and a printer (not shown) which may be connected to the computing device 1001 via Input/Output Interface 1010. Any step and/or result of the methods may be output in any form to an output device. Such output may be any form of visual representation, including, but not limited to, textual, graphical, animation, audio, tactile, and the like. The display 1011 and computing device 1001 may be part of one device, or separate devices.

The computing device 1001 may operate in a networked environment using logical connections to one or more remote computing devices 1014*a,b,c*. A remote computing device may be a personal computer, portable computer, smartphone, a server, a router, a network computer, a peer device or other common network node, and so on. Logical connections between the computing device 1001 and a remote computing device 1014*a,b,c* may be made via a network 1015, such as a local area network (LAN) and a general wide area network (WAN). Such network connections may be through a network adapter 1008. A network adapter 1008 may be implemented in both wired and wireless environments. Such networking environments are conventional and commonplace in dwellings, offices, enterprise-wide computer networks, intranets, and the Internet.

Application programs and other executable program components such as the operating system 1005 are shown herein as discrete blocks, although it is recognized that such programs and components reside at various times in different storage components of the computing device 1001, and are executed by the data processor(s) of the computer. An implementation of video compression software 1006 may be stored on or transmitted across some form of computer readable media. Any of the disclosed methods may be performed by computer readable instructions embodied on computer readable media. Computer readable media may be any available media that may be accessed by a computer. Computer readable media may comprise "computer storage media" and "communications media." "Computer storage media" comprise volatile and non-volatile, removable and non-removable media implemented in any methods or technology for storage of information such as computer readable instructions, data structures, program modules, or other data. Computer storage media may comprise, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. The endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods, systems, and apparatuses. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods, systems, and apparatuses. This applies to all features of this application including, but not limited to, components and/or steps in disclosed methods, systems, and apparatuses. Thus, if there are a variety of additional steps that may be performed it is understood that each of these additional steps may be performed with any specific embodiment or combination of embodiments of the disclosed methods, systems, and apparatuses.

While the methods, systems, and apparatuses have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
   receiving video data comprising a plurality of frames;

encoding at least a portion of a frame of the plurality of frames, wherein the encoding the at least a portion of the frame comprises:

determining a first chrominance component of a first pixel of the at least a portion of the frame, wherein the first chrominance component of the first pixel is based on a first chrominance component of an encoded second pixel, and determining a luma component of the first pixel, wherein the luma component of the first pixel corresponds to a luma component of a corresponding pixel from the video data; and outputting the encoded at least a portion of the frame.

2. The method of claim 1, wherein the encoding the at least a portion of the frame further comprises:

determining a second chrominance component of the first pixel, wherein the second chrominance component of the first pixel is based on a second chrominance component of the encoded second pixel.

3. The method of claim 1, wherein the encoded second pixel is from the frame of the plurality of frames.

4. The method of claim 1, wherein the encoded second pixel is from a second frame of the plurality of frames.

5. The method of claim 1, wherein the encoding the at least a portion of the frame further comprises:

determining a second chrominance component of the first pixel, wherein the second chrominance component of the first pixel is based on a chrominance component of an encoded third pixel.

6. The method of claim 1, wherein the determining the first chrominance component of the first pixel comprises:

performing a best match search for the encoded second pixel, wherein the best match search is based on the first chrominance component of the encoded second pixel, exclusive of a luma component of the encoded second pixel.

7. The method of claim 1, wherein the encoding the at least a portion of the frame further comprises:

performing a discrete cosine transform on a partition comprising the first pixel, wherein the discrete cosine transform is based on a respective chrominance component of each pixel of the partition, exclusive of a respective luma component of each pixel of the partition.

8. A method comprising:

receiving video data comprising a plurality of frames;

encoding at least a portion of the plurality of frames, wherein the encoding the at least the portion of the plurality of frames comprises:

determining a first chrominance component of a first frame of the plurality of frames, wherein the first chrominance component of the first frame is based on a first chrominance component of an encoded second frame of the plurality of frames, and determining a luma component of the first frame, wherein the luma component of the first frame corresponds to a luma component of a corresponding frame from the video data; and outputting the encoded at least a portion of the plurality of frames.

9. The method of claim 8, wherein the encoding the at least the portion of the plurality of frames further comprises:

determining a second chrominance component of the first frame, wherein the second chrominance component of the first frame is based on a second chrominance component of the encoded second frame.

10. The method of claim 8, wherein the encoding the at least the portion of the plurality of frames further comprises:

determining a second chrominance component of the first frame, wherein the second chrominance component of the first frame is based on a chrominance component of an encoded third frame of the plurality of frames.

11. The method of claim 8, wherein the determining the first chrominance component of the first frame comprises:

performing a best match search for the encoded second frame, wherein the best match search is based on the first chrominance component of the encoded second frame, exclusive of a luma component of the encoded second frame.

12. The method of claim 8, wherein the encoding the at least the portion of the plurality of frames further comprises:

performing a discrete cosine transform on a partition comprising at least the first frame, wherein the discrete cosine transform is based on a respective chrominance component of each frame of the partition, exclusive of a respective luma component of each frame of the partition.

13. A method comprising:

receiving video data comprising a plurality of frames;

determining a first chrominance component of a first pixel of at least a portion of the frame, wherein the first chrominance component of the first pixel is based on a first chrominance component of an encoded second pixel, determining a luma component of the first pixel, wherein the luma component of the first pixel corresponds to a luma component of a corresponding pixel from the video data;

encoding the portion of the frame based on the first chrominance component of the first pixel and the luma component of the first pixel; and outputting the encoded at least a portion of the frame.

14. The method of claim 13, wherein the encoding the at least a portion of the frame further comprises:

determining a second chrominance component of the first pixel, wherein the second chrominance component of the first pixel is based on a second chrominance component of the encoded second pixel.

15. The method of claim 13, wherein the encoded second pixel is from the frame of the plurality of frames.

16. The method of claim 13, wherein the encoded second pixel is from a second frame of the plurality of frames.

17. The method of claim 13, wherein the encoding the at least a portion of the frame further comprises:

determining a second chrominance component of the first pixel, wherein the second chrominance component of the first pixel is based on a chrominance component of an encoded third pixel.

18. The method of claim 13, wherein the determining the first chrominance component of the first pixel comprises:

performing a best match search for the encoded second pixel, wherein the best match search is based on the first chrominance component of the encoded second pixel, exclusive of a luma component of the encoded second pixel.

19. The method of claim 13, wherein the encoding the at least a portion of the frame further comprises:

performing a discrete cosine transform on a partition comprising the first pixel, wherein the discrete cosine transform is based on a respective chrominance component of each pixel of the partition, exclusive of a respective luma component of each pixel of the partition.

20. The method of claim 13, wherein the video data further comprises raw video data.

\* \* \* \* \*